United States Patent
Qian et al.

(10) Patent No.: US 11,572,196 B2
(45) Date of Patent: Feb. 7, 2023

(54) METHODS AND SYSTEMS FOR MOVEMENT CONTROL OF FLYING DEVICES

(71) Applicant: SZ DJI TECHNOLOGY CO., LTD., Shenzhen (CN)

(72) Inventors: Jie Qian, Shenzhen (CN); Cong Zhao, Shenzhen (CN); You Zhou, Shenzhen (CN); Xuyang Feng, Shenzhen (CN); Junfeng Yu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 156 days.

(21) Appl. No.: 17/189,237

(22) Filed: Mar. 1, 2021

(65) Prior Publication Data
US 2021/0276731 A1 Sep. 9, 2021

Related U.S. Application Data

(63) Continuation of application No. 16/115,149, filed on Aug. 28, 2018, now Pat. No. 10,946,980, which is a
(Continued)

(51) Int. Cl.
*H04N 9/47* (2006.01)
*B64D 47/08* (2006.01)
(Continued)

(52) U.S. Cl.
CPC .......... *B64D 47/08* (2013.01); *B64C 39/024* (2013.01); *G03B 15/006* (2013.01);
(Continued)

(58) Field of Classification Search
CPC .......... B64C 39/024; B64C 2201/024; B64C 2201/027; B64C 2201/123; B64C 2201/146; G03B 15/006; G05D 1/0094
See application file for complete search history.

(56) References Cited

U.S. PATENT DOCUMENTS

| | | | |
|---|---|---|---|
| 9,817,396 B1 | 11/2017 | Takayama et al. | |
| 10,086,309 B2 * | 10/2018 | Yamada | A63H 33/18 |

(Continued)

FOREIGN PATENT DOCUMENTS

| | | |
|---|---|---|
| CN | 103285599 A | 9/2013 |
| CN | 103345259 A | 10/2013 |

(Continued)

OTHER PUBLICATIONS

The World Intellectual Property Organization (WIPO) International Search Report and Written Opinion for PCT/CN2016/074824 dated Dec. 1, 2016 9 Pages.
(Continued)

*Primary Examiner* — Fabio S Lima
(74) *Attorney, Agent, or Firm* — Anova Law Group, PLLC

(57) ABSTRACT

A method for controlling a movable object is provided. A user input that includes a first parameter corresponding to a first coordinate system is received and an operation mode is determined. In response to determining the operation mode being a first operation mode, a second parameter corresponding to a second coordinate system is generated and the movable object is controlled to move based on the second parameter. In response to determining the operation mode being a second operation mode, the first parameter is translated to a third parameter corresponding to the second coordinate system and the movable object is controlled to move based on the third parameter.

20 Claims, 23 Drawing Sheets

Related U.S. Application Data continuation of application No. PCT/CN2016/074824, filed on Feb. 29, 2016.

(51) Int. Cl.
*B64C 39/02* (2006.01)
*G03B 15/00* (2021.01)
*G05D 1/00* (2006.01)

(52) U.S. Cl.
CPC ...... *G05D 1/0094* (2013.01); *B64C 2201/024* (2013.01); *B64C 2201/027* (2013.01); *B64C 2201/123* (2013.01); *B64C 2201/127* (2013.01); *B64C 2201/128* (2013.01); *B64C 2201/146* (2013.01)

(56) References Cited

U.S. PATENT DOCUMENTS

| | | | |
|---|---|---|---|
| 2009/0204276 A1* | 8/2009 | Stuckman | A63H 27/12 701/2 |
| 2010/0250022 A1 | 9/2010 | Hines et al. | |
| 2012/0168240 A1 | 7/2012 | Wilson et al. | |
| 2013/0173088 A1 | 7/2013 | Callou et al. | |
| 2013/0211592 A1 | 8/2013 | Kim et al. | |
| 2014/0008496 A1 | 1/2014 | Ye et al. | |
| 2015/0298799 A1* | 10/2015 | Bertrand | A63H 27/12 244/17.23 |
| 2015/0355639 A1 | 12/2015 | Versteeg et al. | |
| 2017/0073074 A1* | 3/2017 | Gagnon | B60Q 3/44 |
| 2017/0269594 A1 | 9/2017 | Sydnor | |

FOREIGN PATENT DOCUMENTS

| | | |
|---|---|---|
| CN | 103492967 A | 1/2014 |
| CN | 104898699 A | 9/2015 |
| CN | 104906805 A | 9/2015 |
| EP | 2497555 A1 | 9/2012 |
| JP | 2013033379 A | 2/2013 |
| JP | 2013144539 A | 7/2013 |
| JP | 2016525973 A | 9/2016 |
| WO | 2016015251 A1 | 2/2016 |

OTHER PUBLICATIONS

Palladino, Tangential and Angular Velocity: https://www.youtube.com/watch?v=9QDKnQm_pol, Nov. 20, 2011, Youtube (Year: 2011).

* cited by examiner

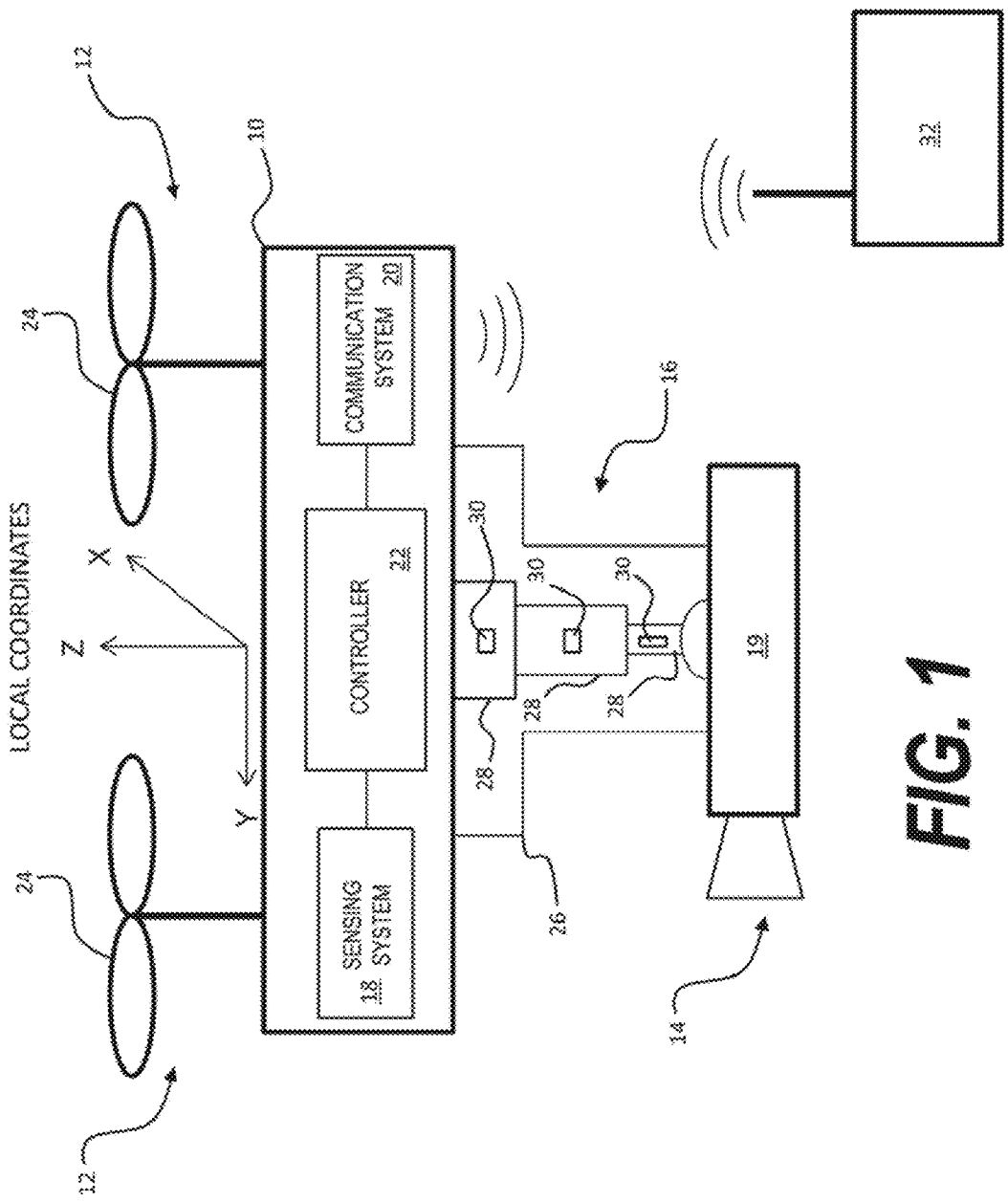

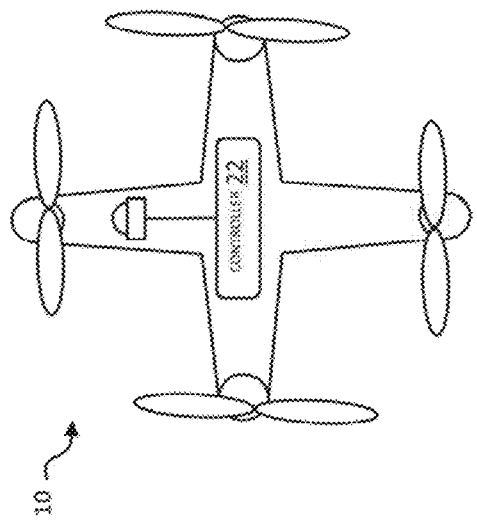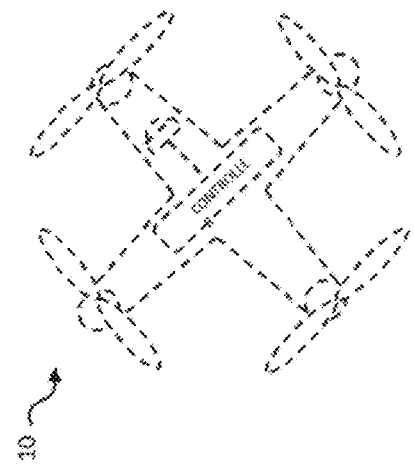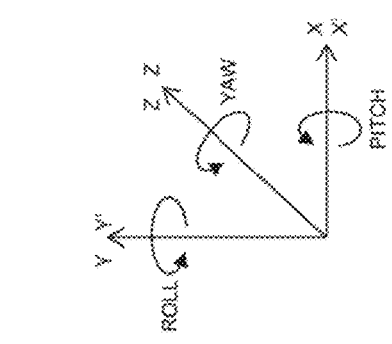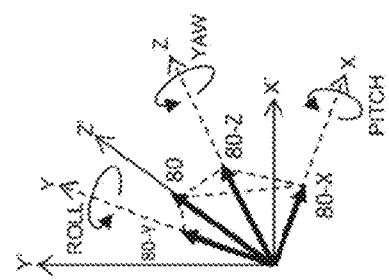
FIG. 9A
FIG. 9B
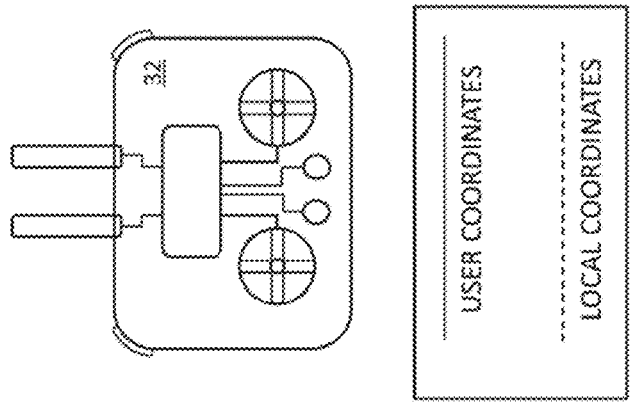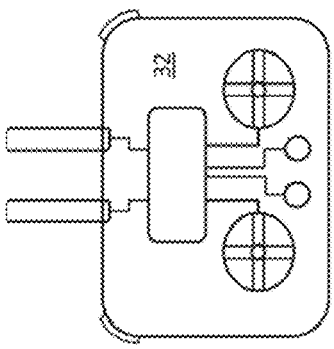

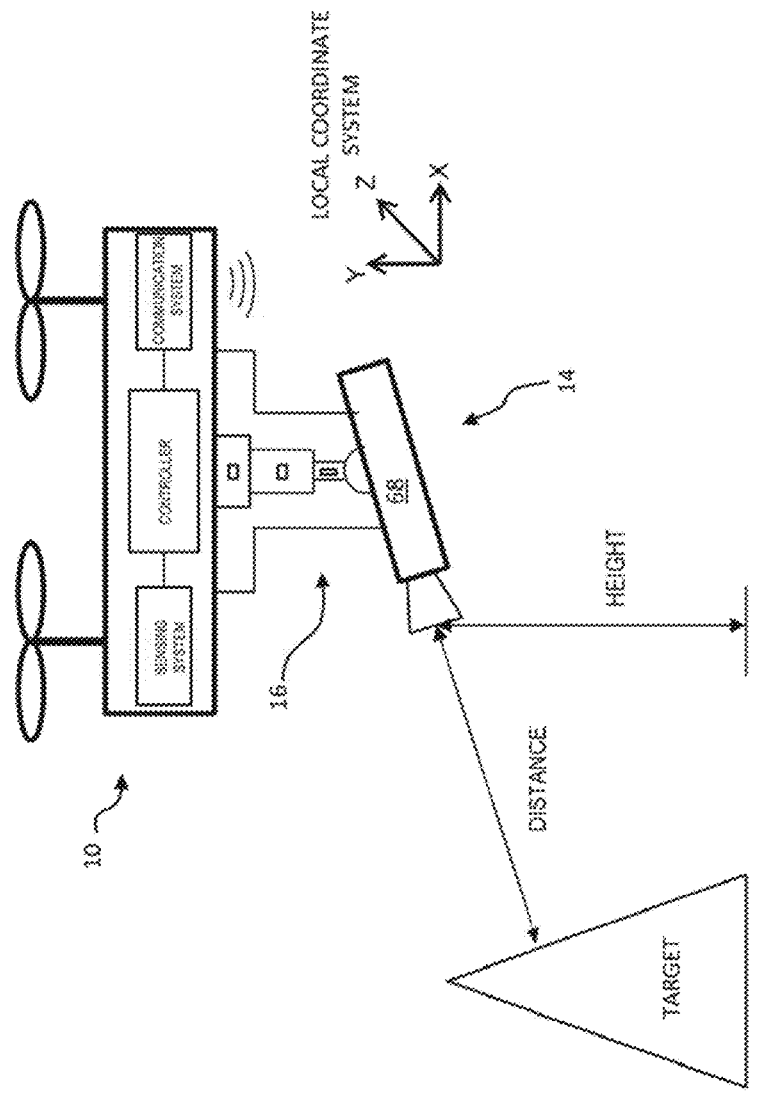
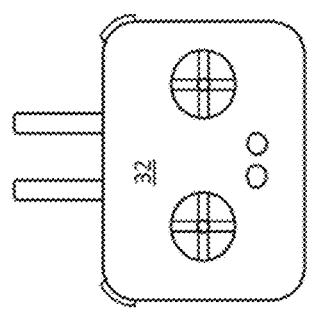
FIG. 12

METHODS AND SYSTEMS FOR MOVEMENT CONTROL OF FLYING DEVICES

CROSS-REFERENCE TO RELATED APPLICATIONS

This application is a continuation application of U.S. application Ser. No. 16/115,149, filed on Aug. 28, 2018, which is a continuation application of International Application No. PCT/CN2016/074824, filed on Feb. 29, 2016, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to device movement control and, more particularly, to methods and systems for movement control of flying devices.

BACKGROUND

Unmanned aerial vehicles ("UAV"), sometimes referred to as "drones," include pilotless aircraft of various sizes and configurations that can be remotely operated by a user and/or programmed for automated flight. UAVs can be used for many purposes and are often used in a wide variety of personal, commercial, and tactical applications. In many applications, UAVs can also be equipped with secondary devices to perform various tasks. For instance, UAVs equipped with imaging equipment, such as cameras, video cameras, etc., can capture images or video footage that is difficult, impractical, or simply impossible to capture otherwise. UAVs equipped with imaging devices find particular use in the surveillance, national defense, and professional videography industries, among others, and are also popular with hobbyists and for recreational purposes.

Image quality can be affected by multiple aspects of UAV flight control, and it can be difficult to control the movement of a UAV while simultaneously operating the imaging equipment attached to the UAV. For instance, it can be difficult to effectively operate imaging equipment attached to a UAV while also precisely controlling the distance of the UAV from the subject or target, the multi-axis spatial orientation of the UAV, and the flight stability of the UAV, each of which can affect image quality. Simultaneous control of a UAV and attached imaging equipment can be even more challenging when the target is in motion or while making complicated flight maneuvers during which the user's spatial frame of reference differs from the spatial frame of reference of the UAV control system.

SUMMARY

In one aspect, the present disclosure relates to a method of controlling a movable object having a first perspective. The method may include receiving an input signal from a second perspective, translating the input signal from the second perspective to the first perspective, causing movement of the movable object based on the translated signal.

In another aspect, the present disclosure relates to a system for controlling a movable object having a first perspective. The system may include a controller having one or more processors. The controller may be configured to receive an input signal from a second perspective, translate the input signal from the second perspective to the first perspective, and cause movement of the movable object based on the translated signal.

In yet another aspect, the present disclosure relates to an unmanned aerial vehicle (UAV) system having a first perspective. The UAV system may include one or more propulsion devices and a controller in communication with the one or more propulsion devices. The controller may be configured to control the UAV to track a target object, the controller comprising one or more processors configured to receive an input signal from a second perspective, translate the input signal from the second perspective to the first perspective, and generate one or more signals to control the one or more propulsion devices and cause movement of the UAV based on the translated signal.

In yet another aspect, the present disclosure relates to a non-transitory computer-readable medium storing instructions, that, when executed, cause a computer to perform a method of controlling a movable object having a first perspective, wherein the method includes receiving an input signal from a second perspective, translating the input signal from the second perspective to the first perspective, and causing movement of the movable object based on the translated signal.

In yet another aspect, the present disclosure relates to a method for controlling a movable object having a first coordinate system. The method may include determining an offset between the first coordinate system and a second coordinate system, receiving user input indicative of a desired movement of the movable object in the second coordinate system, and generating control signals in the first coordinate system based on the user input and the offset between the first and second coordinate systems, wherein the control signals are configured to cause the movable object to make a movement in the first coordinate system according to the control signals and the movement in the first coordinate system corresponds to the desired movement in the second coordinate system.

In yet another aspect, the present disclosure relates to a system for controlling a movable object having a first coordinate system. The system may include a controller having one or more processors and being configured to determine an offset between the first coordinate system and a second coordinate system, receive user input indicative of a desired movement of the movable object in the second coordinate system, generate control signals in the first coordinate system based on the user input and the offset between the first and second coordinate systems, wherein the control signals are configured to cause the movable object to make a movement in the first coordinate system according to the control signals and the movement in the first coordinate system corresponds to the desired movement in the second coordinate system.

In yet another aspect, the present disclosure relates to an unmanned aerial vehicle (UAV) system having a first perspective. The UAV system may include one or more propulsion devices and a controller in communication with the one or more propulsion devices. The controller may be configured to control the UAV to track a target object, the controller comprising one or more processors configured to determine an offset between the first coordinate system and a second coordinate system, receive user input indicative of a desired movement of the movable object in the second coordinate system, and generate control signals in the first coordinate system based on the user input and the difference between the first and second coordinate systems, wherein the control signals are configured to control the one or more propulsion device and cause the movable object to make a movement in the first coordinate system corresponding to the desired movement in the second coordinate system.

In yet another aspect, the present disclosure relates to a non-transitory computer readable medium storing instructions that, when executed, cause a computer to perform a method for controlling a movable object having a first coordinate system, wherein the method includes determining an offset between the first coordinate system and a second coordinate system, receiving user input indicative of a desired movement of the movable object in the second coordinate system, and generating control signals in the first coordinate system based on the user input and the offset between the first and second coordinate systems, wherein the control signals are configured to cause the movable object to make a movement in the first coordinate system according to the control signals and the movement in the first coordinate system corresponds to the desired movement in the second coordinate system.

In yet another aspect, the present disclosure relates to a method for controlling a movable object. The method may include receiving a user input indicative of a command to adjust a perception of a target while tracking the target, determining a subsequent perception of the target based on the user input, and generating one or more control signals to move the movable object based on the subsequent perception of the target.

In yet another aspect, the present disclosure relates to a system for controlling a movable object. The system may include a controller having one or more processors configured to receive a user input indicative of a command to adjust a perception of a target while tracking the target, determine a subsequent perception of the target based on the user input, and generate one or more control signals to move the movable object based on the subsequent perception of the target.

In yet another aspect, the present disclosure relates to an unmanned aerial vehicle (UAV) system having a first perspective. The UAV system may include one or more propulsion devices and a controller in communication with the one or more propulsion devices and configured to control the UAV to track a target object, the controller comprising one or more processors configured to receive a user input indicative of a command to adjust a perception of a target while tracking the target, determine a subsequent perception of the target based on the user input, and generate one or more signals to control the one or more propulsion devices to move the movable object based on the subsequent perception of the target.

In yet another aspect, the present disclosure relates to a non-transitory computer readable medium storing instructions that, when executed, cause a computer to perform a method for controlling a movable object, wherein the method includes receiving a user input indicative of a command to adjust a perception of a target while tracking the target, determining a subsequent perception of the target based on the user input, and generating one or more control signals to move the movable object based on the subsequent perception of the target.

BRIEF DESCRIPTION OF THE DRAWINGS

FIG. 1 shows a movable object with a carrier and a payload and a control terminal consistent with the present disclosure;

FIGS. 9A and 9B show movable objects, control terminals, and coordinate systems consistent with embodiments of the present disclosure;

FIG. 12 shows a system for controlling a movable object that is consistent with the present disclosure;

DETAILED DESCRIPTION

Figure 2B:
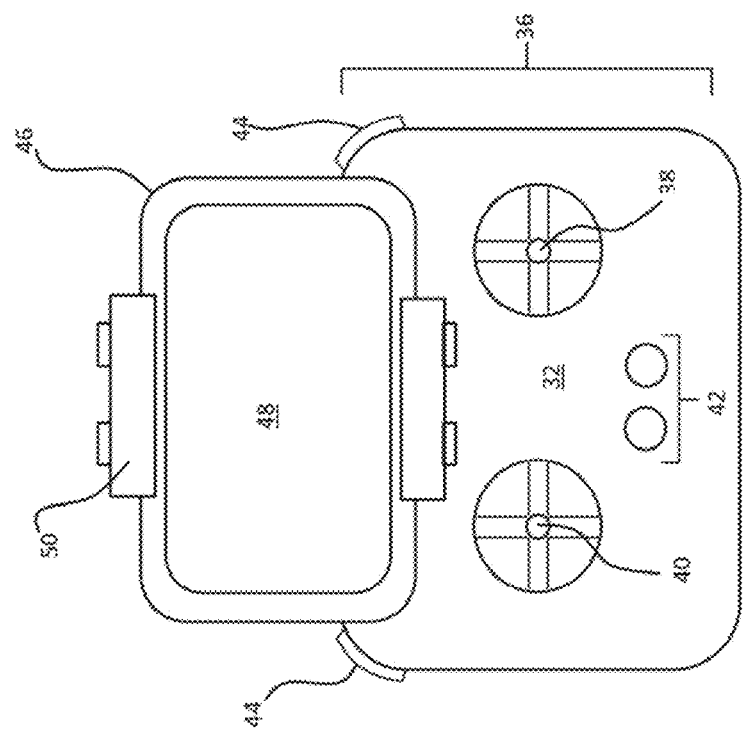
FIGS. 2A and 2B show control terminals that may be used with embodiments consistent with the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Unmanned aerial vehicles (UAV) are recognized in many industries and in many situations as useful tools for relieving personnel of the responsibility for directly performing certain tasks. For instance, UAVs have been used to deliver cargo, conduct surveillance, and collect various types of imaging and sensory data (e.g., photo, video, ultrasonic, infrared, etc.) in professional and recreational settings, providing great flexibility and enhancement of human capabilities.

Although they may be "unmanned," that is, operated without onboard personnel, UAVs are often fully or partially operated by off-board personnel who may be responsible for controlling multiple aspects of flight and/or other associated tasks (e.g., controlling cargo, operating imaging equipment, etc.). In many situations, associated tasks, such as operating imaging equipment mounted to the UAV, must be performed simultaneously with flight control, which can be challenging.

For example, in professional photography, filmography, and videography, UAVs may be used to capture footage from stationary and/or moving perspectives that may be otherwise too challenging, impractical, or impossible for personnel to capture. But the conveniences of UAVs in these situations do not eliminate the need for UAV operators to carefully control the imaging equipment to obtain high quality results. Additionally, use of imaging equipment on a UAV requires skilled control of UAV flight parameters, because image quality can be reduced by inconsistent or unstable flight, such as when flight parameters (e.g., roll, pitch, yaw, altitude, throttle, relative position or speed with respect to a target, etc.) are allowed to fluctuate or vary substantially or otherwise poorly controlled.

As is the case for many types of UAVs, multiple flight parameters can be separately controlled by the operator via an input device (e.g., a remote control). During complicated flight maneuvers and/or while collecting imaging data, even highly skilled UAV operators may find difficulty in maintaining a sufficient level of control over each flight parameter while attempting to obtain high quality image results. In these and other situations that demand a high degree of control of each flight parameter, UAV operators may wish for reduced complexity of overall flight control. Disclosed herein are exemplary embodiments of methods, systems, and devices for controlling movable objects, such as a UAV, that may allow operators to control the movable objects with relative ease and a higher degree of precision. In particular, embodiments described herein allow a user to operate a UAV from the user's perspective instead of the flight parameters from the UAV's perspective. For example, as opposed to control a pitch angle of the UAV, the user may simply operate the remote control to send a command for the UAV to go up, and methods and systems consistent with the present disclosure would convert such an intuitive command into flight control signals or flight parameters that can be directly used to adjust the flight behavior of the UAV.

FIG. 1 shows an exemplary movable object 10 that may be configured to move or travel within an environment. Movable object 10 may be any suitable object, device, mechanism, system, or machine configured to travel on or within a suitable medium (e.g., a surface, air, water, rails, space, underground, etc.). For example, movable object 10 may be an unmanned aerial vehicle (UAV). Although movable object 10 is shown and described herein as a UAV for exemplary purposes of this description, it is understood that other types of movable object (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 10 may include one or more propulsion devices 12 and may be configured to carry a payload 14. In some embodiments, as shown in FIG. 1, payload 14 may be connected or attached to movable object 10 by a carrier 16, which may allow for one or more degrees of relative movement between payload 14 and movable object 10. In other embodiments, payload 14 may be mounted directly to movable object 10 without carrier 16. Movable object 10 may also include a sensing system 18, a communication system 20, and a controller 22 in communication with the other components.

Movable object 10 may include one or more (e.g., 1, 2, 3, 3, 4, 5, 10, 15, 20, etc.) propulsion devices 12 positioned at various locations (for example, top, sides, front, rear, and/or bottom of movable object 10) for propelling and steering movable object 10. Propulsion devices 12 may be devices or systems operable to generate forces for sustaining controlled flight. Propulsion devices 12 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or combinations thereof. Each propulsion device 12 may also include one or more rotary components 24 drivably connected to the power source and configured to participate in the generation of forces for sustaining controlled flight. For instance, rotary components 24 may include rotors, propellers, blades, nozzles, etc., which may be driven on or by a shaft, axle, wheel, hydraulic system, pneumatic system, or other component or system configured to transfer power from the power source. Propulsion devices 12 and/or rotary components 24 may be adjustable (e.g., tiltable) with respect to each other and/or with respect to movable object 10. Alternatively, propulsion devices 12 and rotary components 24 may have a fixed orientation with respect to each other and/or movable object 10. In some embodiments, each propulsion device 12 may be of the same type. In other embodiments, propulsion devices 12 may be of multiple different types. In some embodiments, all propulsion devices 12 may be controlled in concert (e.g., all at the same speed and/or angle). In other embodiments, one or more propulsion devices may be independently controlled with respect to, e.g., speed and/or angle.

Propulsion devices 12 may be configured to propel movable object 10 in one or more vertical and horizontal directions and to allow movable object 10 to rotate about one or more axes. That is, propulsion devices 12 may be configured to provide lift and/or thrust for creating and maintaining translational and rotational movements of movable object 10. For instance, propulsion devices 12 may be configured to enable movable object 10 to achieve and maintain desired altitudes, provide thrust for movement in all directions, and provide for steering of movable object 10. In some embodiments, propulsion devices 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion devices 12 may be configured to enable movement of movable object 10 along and/or about multiple axes, as described below in connection with FIGS. 2, 3A-3C, and 4A-4B.

Payload 14 may include one or more sensory devices 19. Sensory devices 19 may include devices for collecting or generating data or information, such as surveying, tracking, and capturing images or video of targets (e.g., objects, landscapes, subjects of photo or video shoots, etc.). Sensory devices 19 may include imaging devices configured to gathering data that may be used to generate images. For example, imaging devices may include photographic cameras, video cameras, infrared imaging devices, ultraviolet imaging devices, x-ray devices, ultrasonic imaging devices, radar devices, etc. Sensory devices 19 may also or alternatively include devices or capturing audio data, such as microphones or ultrasound detectors. Sensory devices 19 may also or alternatively include other suitable sensors for capturing visual, audio, and/or electromagnetic signals.

Carrier 16 may include one or more devices configured to hold the payload 14 and/or allow the payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow 360° of rotation about each axis to allow for greater control of the perspective of the payload 14. In other embodiments, carrier 16 may limit the range of rotation of payload 14 to less than 360° (e.g., ≤270°, ≤210°, ≤180, ≤120°, ≤90°, ≤45°, ≤30°, ≤15° etc.), about one or more of its axes.

Carrier 16 may include a frame assembly 26, one or more actuator members 28, and one or more carrier sensors 30. Frame assembly 26 may be configured to couple the payload 14 to the movable object 10 and, in some embodiments, allow payload 14 to move with respect to movable object 10. In some embodiments, frame assembly 26 may include one or more sub-frames or components movable with respect to each other. Actuation members 28 may be configured to drive components of frame assembly relative to each other to provide translational and/or rotational motion of payload 14 with respect to movable object 10. In other embodiments, actuator members 28 may be configured to directly act on payload 14 to cause motion of payload 14 with respect to frame assembly 26 and movable object 10. Actuator members 28 may be or include suitable actuators and/or force transmission components. For example, actuator members 28 may include electric motors configured to provide linear or rotation motion to components of frame assembly 26 and/or payload 14 in conjunction with axles, shafts, rails, belts, chains, gears, and/or other components.

Carrier sensors 30 may include devices configured to measure, sense, detect, or determine state information of carrier 16 and/or payload 14. State information may include positional information (e.g., relative location, orientation, attitude, linear displacement, angular displacement, etc.), velocity information (e.g., linear velocity, angular velocity, etc.), acceleration information (e.g., linear acceleration, angular acceleration, etc.), and or other information relating to movement control of carrier 16 or payload 14 with respect to movable object 10. Carrier sensors 30 may include one or more types of suitable sensors, such as potentiometers, optical sensors, visions sensors, magnetic sensors, motion or rotation sensors (e.g., gyroscopes, accelerometers, inertial sensors, etc.). Carrier sensors 30 may be associated with or attached to various components of carrier 16, such as components of frame assembly 26 or actuator members 28, or movable object 10. Carrier sensors 30 may be configured to communicate data and information with controller 22 via a wired or wireless connection (e.g., RFID, Bluetooth, Wi-Fi, radio, cellular, etc.). Data and information generated by carrier sensors 30 and communicated to controller 22 may be used by controller 22 for further processing, such as for determining state information of movable object 10 and/or targets.

Carrier 16 may be coupled to movable object 10 via one or more damping elements configured to reduce or eliminate undesired shock or other force transmissions to payload 14 from movable object 10. Damping elements may be active, passive, or hybrid (i.e., having active and passive characteristics). Damping elements may be formed of any suitable material or combinations of materials, including solids, liquids, and gases. Compressible or deformable materials, such as rubber, springs, gels, foams, and/or other materials may be used as damping elements. The damping elements may function to isolate payload 14 from movable object 10 and/or dissipate force propagations from movable object 10 to payload 14. Damping elements may also include mechanisms or devices configured to provide damping effects, such as pistons, springs, hydraulics, pneumatics, dashpots, shock absorbers, and/or other devices or combinations thereof.

Sensing system 18 may include one or more sensors associated with one or more components or other systems of movable device 10. For instance, sensing system may include sensors for determining positional information, velocity information, and acceleration information relating to movable object 10 and/or targets. In some embodiments, sensing system may also include carrier sensors 30. Components of sensing system 18 may be configured to generate data and information that may be used (e.g., processed by controller 22 or another device) to determine additional information about movable object 10, its components, or its targets. Sensing system 18 may include one or more sensors for sensing one or more aspects of movement of movable object 10. For example, sensing system 18 may include sensory devices associated with payload 14 as discussed above and/or additional sensory devices, such as a positioning sensor for a positioning system (e.g., GPS, GLONASS, Galileo, Beidou, GAGAN, etc.), motion sensors, inertial sensors (e.g., IMU sensors), proximity sensors, image sensors, etc. Sensing system 18 may also include sensors or be configured to provide data or information relating to the surrounding environment, such as weather information (e.g., temperature, pressure, humidity, etc.), lighting conditions, air constituents, or nearby obstacles (e.g., objects, structures, people, other vehicles, etc.).

Communication system 20 may be configured to enable communications of data, information, commands, and/or other types of signals between controller 22 and off-board entities. Communication system 20 may include one or more components configured to send and/or receive signals, such as receivers, transmitter, or transceivers that are configured to carry out one- or two-way communication. Components of communication system 20 may be configured to communicate with off-board entities via one or more communication networks, such as radio, cellular, Bluetooth, Wi-Fi, RFID, and/or other types of communication networks usable to transmit signals indicative of data, information, commands, and/or other signals. For example, communication system 20 may be configured to enable communications between devices for providing input for controlling movable object 10 during flight, such as a control terminal ("terminal") 32.

Terminal 32 may be configured to receive input, such as input from a user (i.e., user input), and communicate signals indicative of the input to controller 22. Terminal 32 may be configured to receive input and generate corresponding signals indicative of one or more types of information, such as control data (e.g., signals) for moving or manipulating movable device 10 (e.g., via propulsion devices 12), payload 14, and/or carrier 16. Terminal 32 may also be configured to receive data and information from movable object 10, such as operational data relating to, for example, positional data, velocity data, acceleration data, sensory data, and other data and information relating to movable object 10, its components, and/or its surrounding environment. Terminal 32 may be a remote control with physical sticks configured to control flight parameters, or a touch screen device, such as a smartphone or a tablet, with virtual controls for the same purposes, or an application on a smartphone or a table, or a combination thereof.

Figure 2A:
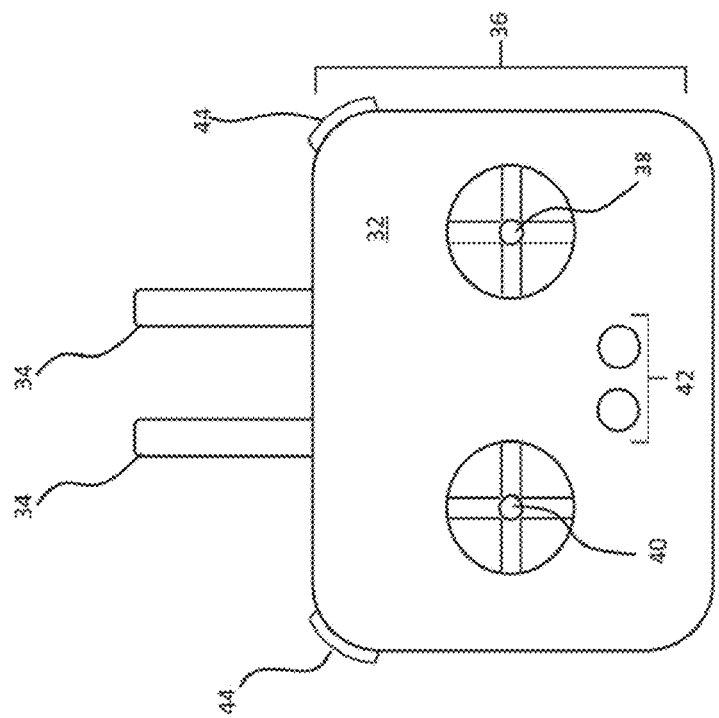

In the example shown in FIGS. 2A and 2B, terminal 32 may include communication devices 34 that facilitate communication of information between terminal 32 and other entities, such as movable object 10. Communication devices 34 may include antennae or other devices configured to send or receive signals. Terminal 32 may also include one or more input devices 36 configured to receive input from a user for communication to movable object 10. FIG. 2A shows one exemplary embodiment of terminal 32 having a plurality of input devices 36 configured to receive user inputs indicative of desired movements of movable object 10 or its components. It is understood, however, that other possible embodiments or layouts of terminal may be possible and are within the scope of this disclosure.

Terminal 32 may include input devices, such as input levers 38 and 40, buttons 42, triggers 44, and or other types of input device for receiving one or more inputs from the user. Each input device of terminal 32 may be configured to generate an input signal communicable to controller 22 and usable by controller 22 as inputs for processing. In addition to flight control inputs, terminal 32 may be used to receive user inputs of other information, such as manual control settings, automated control settings, control assistance settings etc., which may be received, for example, via buttons 42 and/or triggers 44. It is understood that terminal 32 may include other or additional input devices, such as buttons, switches, dials, levers, triggers, touch pads, touch screens, soft keys, a mouse, a keyboard, and/or other types of input devices.

As shown in FIG. 2B, terminal 32 may also include a display device 46 configured to display and/or receive information to and/or from a user. For example, terminal 32 may be configured to receive signals from movable object 10, which signals may be indicative of information or data relating to movements of movable object 10 and/or data (e.g., imaging data) captured using movable object 10 (e.g., in conjunction with payload 14). In some embodiments, display device 46 may be a multifunctional display device configured to display information on a multifunctional screen 48 as well as receive user input via the multifunctional screen 48. For example, in one embodiment, display device 46 may be configured to receive one or more user inputs via multifunctional screen 48. In another embodiment, multifunctional screen 48 may constitute a sole input device for receiving user input.

In some embodiments, terminal 32 may be or include an interactive graphical interface for receiving one or more user inputs. That is, terminal 32 may be a graphical user interface (GUI) and/or include one or more graphical versions of input devices 36 for receiving user input. Graphical versions of terminal 32 and/or input devices 36 may be displayable on a display device (e.g., display device 46) or a multifunctional screen (e.g., multifunctional screen 48) and include graphical features, such as interactive graphical features (e.g., graphical buttons, text boxes, dropdown menus, interactive images, etc.). For example, in one embodiment, terminal 32 may include graphical representations of input levers 38 and 40, buttons 42, and triggers 44, which may be displayed on and configured to receive user input via multifunctional screen 48. In some embodiments, terminal 32 may be configured to receive all user inputs via graphical input devices, such as graphical versions of input devices 36. Terminal 32 may be configured to generate graphical versions of input devices 36 in conjunction with a computer application (e.g., an "app") to provide an interactive interface on the display device or multifunctional screen of any suitable electronic device (e.g., a cellular phone, a tablet, etc.) for receiving user inputs.

In some embodiments, display device 46 may be an integral component of terminal 32. That is, display device 46 may be attached or fixed to terminal 32. In other embodiments, display device may be connectable to (and disconnectable from) terminal 32. That is terminal 32 may be configured to be electronically connectable to display device 46 (e.g., via a connection port or a wireless communication link) and/or otherwise connectable to terminal 32 via a mounting device 50, such as by a clamping, clipping, clasping, hooking, adhering, or other type of mounting device.

In some embodiments, terminal 32 may be configured to communicate with electronic devices configurable for controlling movement and/or other operational aspects of movable object 10. For example, display device 46 may be a display component of an electronic device, such as a cellular phone, a tablet, a personal digital assistant, a laptop computer, or other device. In this way, users may be able to incorporate the functionality of other electronic devices into aspects of controlling movable object 10, which may allow for more flexible and adaptable control schemes to be used. For example, terminal 32 may be configured to communicate with electronic devices having a memory and at least one processor, which control devices may then be used to provide user input via input devices associated with the electronic device (e.g., a multifunctional display, buttons, stored apps, web-based applications, etc.). Communication between terminal 32 and electronic devices may also be configured to allow for software update packages and/or other information to be received and then communicated to controller 22 (e.g., via communication system 20).

It is noted that other control conventions that relate inputs received via terminal 32 to desired or actual movements of movable device 10 may be used, if desired.

Figure 3:
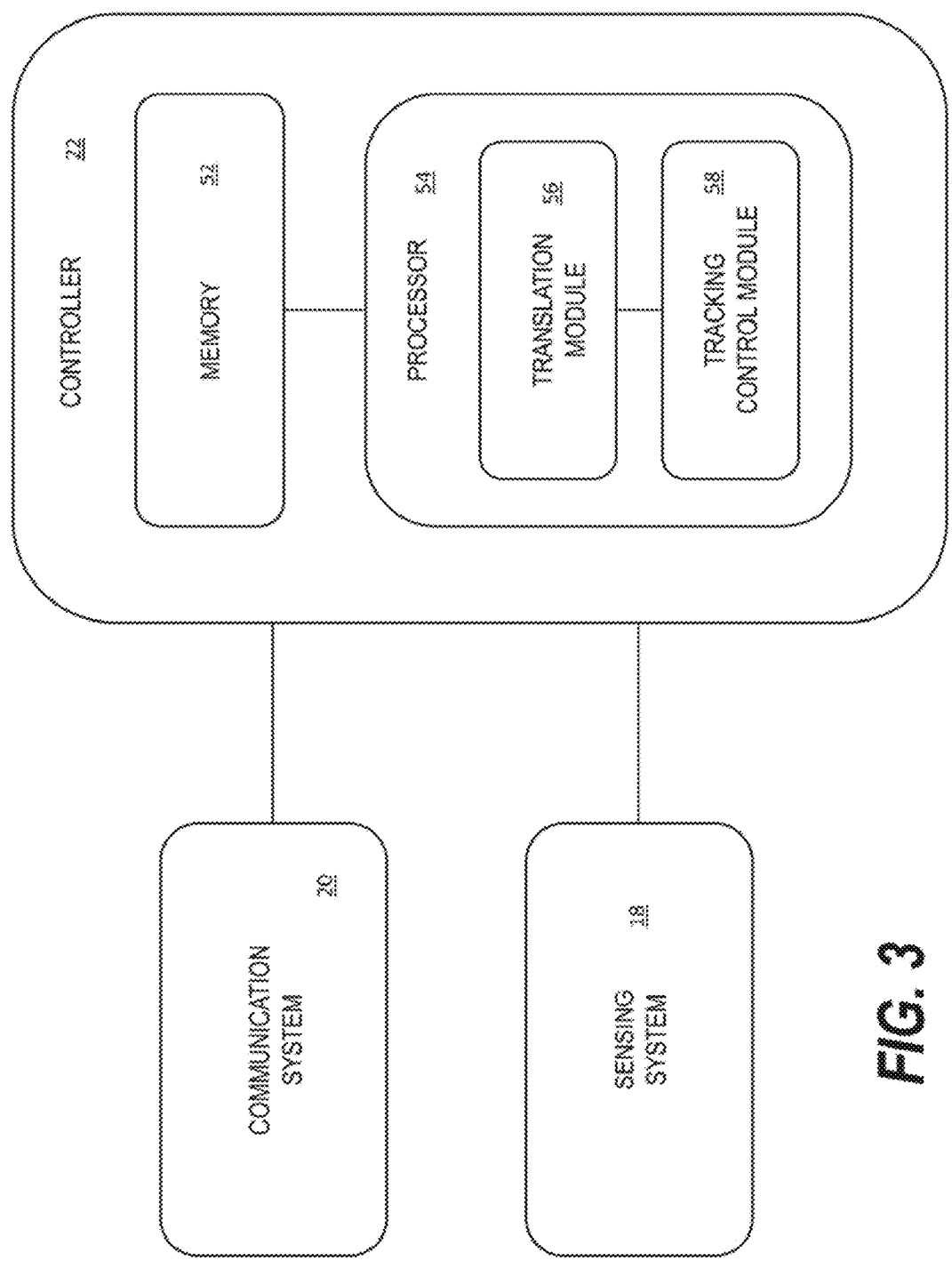
FIG. 3 shows a controller that may be used with embodiments of the present disclosure.

As shown in FIG. 3, controller 22 may include one or more components, for example, a memory 52 and at least one processor 54. Memory 52 may be or include non-transitory computer readable medium and can include one or more memory units of non-transitory computer-readable medium. Non-transitory computer-readable medium of memory 52 may be or include any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Memory units may include permanent and/or removable portions of non-transitory computer-readable medium (e.g., removable media or external storage, such as an SD card, RAM, etc.).

Information and data from sensing system 18 may be communicated to and stored in non-transitory computer-readable medium of memory 52. Non-transitory computer-readable medium associated with memory 52 may also be configured to store logic, code and/or program instructions executable by processor 54 to perform any suitable embodiment of the methods described herein. For example, non-transitory computer-readable medium associated with memory 52 may be configured to store computer-readable instructions that, when executed by processor 54, cause the processor to perform a method comprising one or more steps. The method performed by the processor based on the instructions stored in the non-transitory computer readable medium may involve processing inputs, such as inputs of data or information stored in the non-transitory computer-readable medium of memory 52, inputs received from terminal 32, inputs received from sensing system 18 (e.g., received directly from sensing system or retrieved from memory), and/or other inputs received via communication system 20. The non-transitory computer-readable medium may be configured to store sensing data from the sensing module to be processed by the processing unit. In some embodiments, the non-transitory computer-readable medium can be used to store the processing results produced by the processing unit.

Processor 54 may include or more processors and may embody a programmable processor (e.g., a central processing unit (CPU). Processor 54 may be operatively coupled to memory 52 or another memory device configured to store programs or instructions executable by processor 54 for performing one or more method steps. It is noted that method steps described herein may be stored in memory 52 and configured to be carried out by processor 54 to cause the method steps to be carried out by the processor 54.

In some embodiments, processor 54 may include and/or alternatively be operatively coupled to one or more control modules, such as a translation module 56 and tracking control module 58, which will be explained in greater detail below. Translation module 56 may be configured to control methods of translating information, such as inputs, command, and other signals, from one perspective (e.g., a perspective of the user, a perspective of the movable object 10, etc.) to another perspective (e.g., another of the perspective of the user, the movable object 10, or another perspective). Tracking control module 58 may be configured to help control propulsion devices 12 of movable object 10 to adjust the spatial disposition, velocity, and/or acceleration of the movable object 10 with respect to six degrees of freedom (e.g., there translational directions along its coordinate axes and three rotational directions about its coordinate axes). Translation module 56 and tracking control model 58 may be implemented in software for execution on processor 54, as illustrated in FIG. 6, or may be implemented in hardware or software components separate from processor 54 (not shown in the figure).

Processor 54 can be operatively coupled to the communication system 20 and be configured to transmit and/or receive data from one or more external devices (e.g., terminal 32, display device 46, or other remote controller). Any suitable means of communication can be used to transfer data and information to or from controller 22, such as wired communication or wireless communication. For example, communication system 20 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication system 20 can transmit and/or receive one or more of sensing data from the sensing system 18, processing results produced by the processor 54, predetermined control data, user commands from terminal 32 or a remote controller, and the like.

The components of controller 22 can be arranged in any suitable configuration. For example, one or more of the components of the controller 22 can be located on the movable object 10, carrier 16, payload 14, terminal 32, sensing system 18, or an additional external device in communication with one or more of the above. In some embodiments, one or more processors or memory devices can be situated at different locations, such as on the movable object 10, carrier 16, payload 14, terminal 32, sensing system 18, additional external device in communication with one or more of the above, or suitable combinations thereof, such that any suitable aspect of the processing and/or memory functions performed by the system can occur at one or more of the aforementioned locations.

Figure 4A:
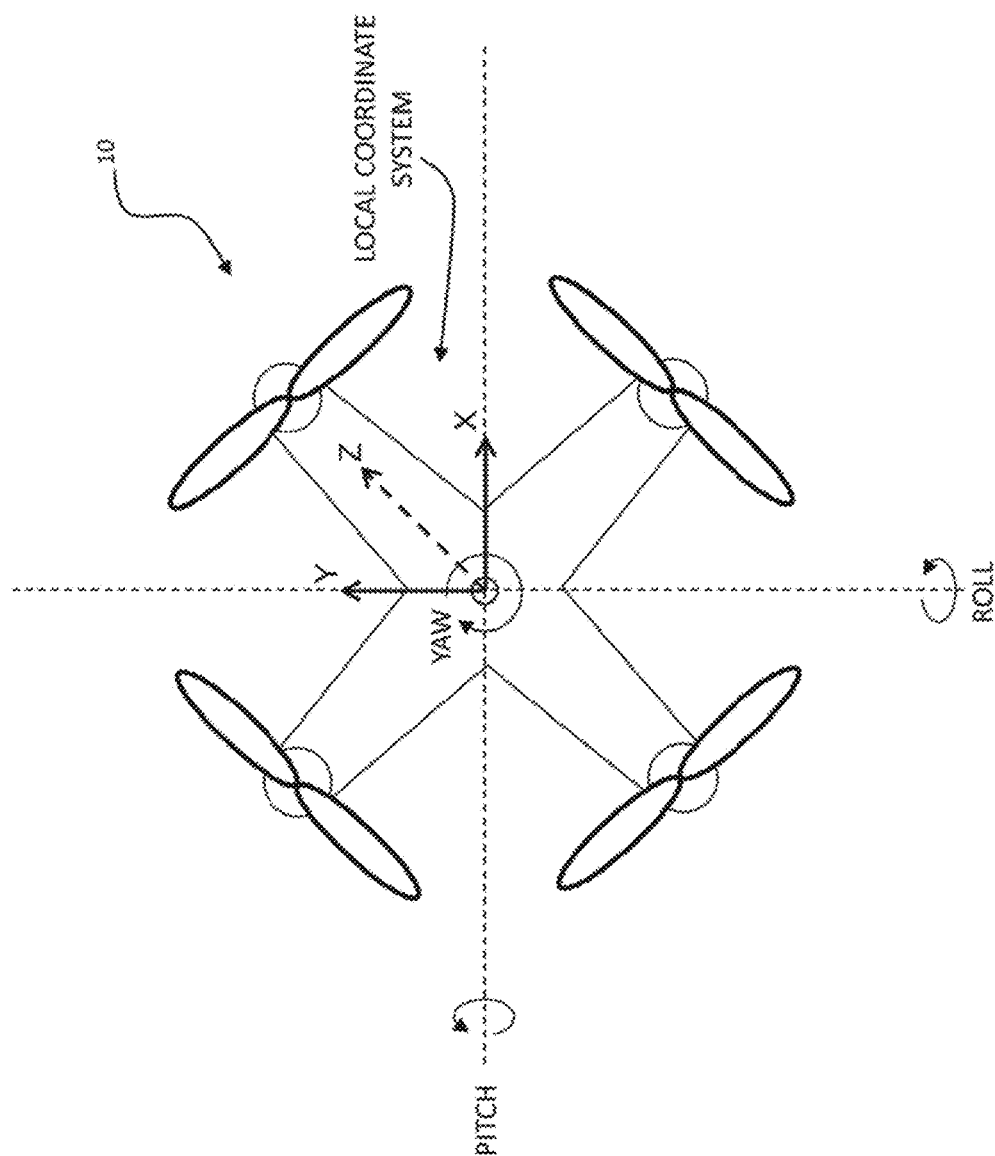
FIGS. 4A-4B illustrates coordinate systems that may be used with embodiments consistent with the present disclosure.

The flight behavior of movable object 10 may be understood and controlled in a defined coordinate system. For example, FIG. 4A illustrates a local coordinate system defined with respect to the movable object 10 for describing movements from the perspective of movable object 10. The local coordinate system may include three axes, such as an X-axis (e.g., a first horizontal axis), a Y-axis (e.g., a second horizontal axis), and a Z-axis (e.g., a vertical axis). Movements of movable object 10 may include roll, pitch, yaw, horizontal translations (e.g., left, right, forward, backward, etc.), vertical translation (e.g., height or altitude), horizontal speeds, vertical speed, rotational speeds (e.g., angular, radial, tangential, axial, etc.), and accelerations (e.g., horizontal, vertical, rotational, etc.). Each axis of the local coordinate system may be associated with one or more particular position or movement parameters that may be changed or adjusted during flight to facilitate effective control of movable object 10.

For instance, in the exemplary local coordinate system of FIG. 4A, each of the X-axis, Y-axis, and Z-axis may be associated with translational movements and linear displacements along or in the direction of the respective axis, as well as rotational movements and angular displacements about the respective axis. In the example of FIG. 4A, the X-axis may also be referred to as a pitch axis, about which movable object 10 may undergo pitch rotational movements (e.g., movements tending to tilt one of a front or rear of movable object 10 upward while tilting the other downward) and along which movable object 10 may undergo side-to-side (e.g., left or right) translational movements. The Y-axis may be referred to as a roll axis, about which the movable object 10 may undergo roll rotational movements (i.e., movements tending to tilt one of a left or right side of movable object 10 upward while tilting the other side downward) and along which movable object 10 may undergo forward and backward translational movements. The Z-axis may be referred to as a yaw axis, about which the movable object 10 may undergo yaw rotational movements (i.e., rotational movements on or parallel with a plane defined by the X- and Y-axes) and along which movable object 10 may undergo up and down (i.e., vertical or altitudinal) translational movements. A person of ordinary skill in the art would appreciate that more or fewer axes, or different axis conventions may be used. It is also noted that directional and planar descriptions (e.g., side-to-side, back and forth, up and down, horizontal, vertical, etc.) are used merely for purposes of example and clarification and are not limiting.

Conventionally, control of the flight of movable object 10 requires control of flight parameters in movable object 10's local coordinate system, such as speed along a certain axis, pitch amount and direction, yaw amount and direction, etc.

Terminal 32 may include control mechanisms for the user to control the flight parameters with respect to the local coordinate system.

For example, referring to FIGS. 2A and 2B, first input lever 38 on terminal 32 may be configured to receive one or more user inputs indicative of one or more aspects of controlling movement of movable object 10. Aspects of controlling movement of movable object 10 may include flight control aspects and payload control aspects. Flight control aspects may include control of one or more aspects of flight achievable by movable object. For instance, flight control aspects may include desired translational movements, desired rotational movements, desired speeds, and desired accelerations of movable device 10. Desired translational movements may include desired vertical or horizontal movements with respect to the perspective of the user, the perspective of movable object 10, a reference perspective, or a different perspective. Desired rotational movements may include desired rotational movements of movable object 10 about one or more axes of a coordinate system associated with a perspective (e.g., the perspective of the user, movable object 10, reference perspective, etc.) or with respect to another object, such as a target. That is, in addition to rotating about an axis of a coordinate system associated with a perspective, desired rotational movements may refer to movements about a reference point associated with a still or moving object or target.

In one embodiment, first input lever 38 may be configured to receive one or more inputs corresponding to one or more desired translational or rotational movements of movable object 10. For example, first input lever 38 may be a multi-axis control device, such as a control stick, configured to be displaced in a plurality of directions, each direction corresponding to a type and sign (e.g., positive, negative, forward, backward, etc.) of a command indicative of a desired movement. The amount of displacement of first input lever 38 from a neutral position may be indicative of an extent or magnitude of the corresponding desired movement. For example, in one embodiment, first input lever 38 may be movable (e.g., tiltable) in a forward direction, backward direction, left direction, and a right direction from the perspective of the user. Displacement in the forward and backward directions may correspond to desired movements along a first axis of a coordinate system for perceiving, describing, or defining the movements of movable device 10. For instance, displacement in the forward direction may be indicative of desired linear movement in a forward direction, while displacement in the backward direction may be indicative of desired linear movement in a backward (i.e., opposite) direction. Displacement of first input lever 38 in the forward direction may also or alternatively correspond to a desired rotational movement of movable device 10 about its pitch axis. For instance, displacement in the forward direction may be indicative of a desired rotational movement in a first rotational direction, while displacement in the backward direction may be indicative of a desired rotational movement in a second (i.e., opposite) rotational direction, both about the pitch axis of movable object 10. The amount or degree of displacement of first input lever 38 in the forward or backward direction may be indicative of a desired linear speed or acceleration along the first axis and/or a desired rotational speed or acceleration about the first axis. A person of ordinary skill in the art would appreciate that other control conventions may be used, and that control functions may be divided among more or a different number of input devices.

Displacement of first input lever 38 in the left and right (i.e., side-to-side) directions may correspond to desired movements along a second axis of a coordinate system for perceiving, describing, or defining the movements of movable device 10. For instance, displacement in the right (i.e., first side) direction may be indicative of desired linear movement in a right (i.e., first side) direction, while displacement in the left direction may be indicative of desired linear movement in a left (i.e., opposite or second side) direction. Displacement of first input lever 38 in the right and left directions may also or alternatively correspond to a desired rotational movement of movable device 10 about its roll axis. For instance, displacement in the right direction may be indicative of a desired rotational movement in a first rotational direction, while displacement in the left direction may be indicative of a desired rotational movement in a second (i.e., opposite) rotational direction, both about the roll axis of movable object 10. The amount or degree of displacement of first input lever 38 in the right or left directions may be indicative of a desired linear speed or acceleration along the second axis and/or a desired rotational speed or acceleration about the second axis.

Second input lever 40 on terminal 32 may be configured to receive one or more user inputs indicative of one or more aspects of controlling movement of movable object 10. In one embodiment, second input lever 40 may be configured to receive one or more inputs corresponding to one or more desired translational or rotational movements of movable object 10. For example, second input lever 40 may be a multi-axis control device, such as a control stick, configured to be displaced in a plurality of directions, each direction corresponding to a type and sign (e.g., positive, negative, forward, backward, etc.) of a command indicative of a desired movement. The amount of displacement of second input lever 40 from a neutral position may be indicative of an extent or magnitude of the corresponding desired movement. For example, in one embodiment, second input lever 40 may be movable (e.g., tiltable) in a forward direction, backward direction, left direction, and a right direction from the perspective of the user. Displacement in the forward and backward directions may correspond to desired movements along a third axis of a coordinate system for perceiving, describing, or defining the movements of movable device 10. For instance, displacement in the forward direction may be indicative of desired linear movement in an upward direction, while displacement in the backward direction may be indicative of desired linear movement in a downward (i.e., opposite) direction. Displacement of second input lever 40 in the forward or backward direction may also or alternatively correspond to a desired power output level of propulsion devices 12. For example, displacement of second input lever 40 in the forward or backward direction may correspond to a desired throttle increase or decrease, respectively. That is, displacement in the forward direction may be indicative of both a desired throttle increase and a desired corresponding height or altitude increase, while displacement in the backward direction may be indicative of a desired throttle decrease and a corresponding height or altitude decrease. The amount or degree of displacement of second input lever 40 in the forward or backward direction may be indicative of a desired linear speed or acceleration along the third axis.

Displacement of second input lever 40 in the left and right (i.e., side-to-side) directions may correspond to desired rotational movements about the third axis of a coordinate system for perceiving, describing, or defining the movements of movable device 10. For instance, displacement of second input lever 40 in the right direction may be indicative of a desired rotational movement in a first rotational direction about the third axis, while displacement in the left direction may be indicative of a desired rotational movement in a second (i.e., opposite) rotational direction, both about the yaw axis of movable object 10. The amount or degree of displacement of second input lever 40 in the right or left directions may be indicative of a desired rotational speed or acceleration about the third axis.

As mentioned above, experience and skills are required for a user to control the various aspects of movable object 10's movements, particularly so during complicated flight maneuvers and/or when the user has to control the operations of attached equipment such as a camera, not only because it may be counterintuitive to think of such flight parameters as pitch, yaw, roll, but also because the perspectives of the user and movable object 10 are often independent and different from each other. For example, when the user is viewing movable object 10 in a direction not aligned with the X-axis of its local coordinate system, the user often has to make a great effort to mentally adjust to the perspective of movable object 10 or physically move or rotate his/her body and head to align with the perspective of movable object 10 to achieve effective control.

Consistent with embodiments of the present disclosure, user control may be provided, received, and interpreted from the user's perspective, and subsequently converted into flight control signals from movable object 10's perspective, such as its local coordinate system shown in FIG. 4A. That way, the user may issue commands in his/her own perspective, often intuitive commands such as left turn, right turn, go up, move closer to a target, move faster, etc., which may then be translated into commands understood by movable object 10, such as pitch, yaw, roll, throttle, etc. Terminal 32 may be configured to receive user input corresponding to such commands. Terminal 32 may convert or translate user input in the user's perspective into signals in the perspective of movable object 10 and transmit the same to movable object 10. Alternatively, terminal 32 may transmit user input in the user's perspective to movable object 10, which then converts or translates the user input into signals in the perspective of movable object 10 before applying the same to the flight parameters.

In some embodiments, terminal 32 and controller 22 may be configured to switch between a first mode in which user inputs received via terminal 32 directly correspond to movements of movable object 10 in the perspective of movable object 10, as discussed above in connection with FIGS. 2A-B and 4A, and a second mode in which user inputs received via terminal 32 correspond to movements of movable object 10 in the use's perspective. For instance, terminal 32 may include a button, switch, knob, a touchscreen icon, or some other type of input or input device configured to receive a user input indicative of a user selection to enter the first or second mode. A pattern of lever operations may also be predefined to effect the switch between modes or selection of modes. Alternatively, controller 22 may assume a default mode, such as either of the first mode or the second mode upon being energized or upon receipt of initial user inputs indicative of flight commands. When in the first mode, controller 22 may be configured to receive user inputs indicative of flight parameters (e.g., roll, pitch, yaw, throttle, etc.) in the user's perspective and generate commands to movable object 10 indicative of corresponding flight parameters in the perspective of movable object 10 without translation. That is, in the first mode, user inputs may be indicative of adjustments to flight parameters of movable object 10 in the perspective of movable object 10. When in the second mode, controller 22 may be configured to receive user inputs indicative of flight parameters (e.g., roll, pitch, yaw, throttle, etc.) to cause desired movement of movable object 10 in the user's perspective and generate translated commands to movable object 10 indicative of flight parameters in the perspective of movable object 10 that cause movements of movable object 10 that correspond to the desired movements of movable object 10 from the user's perspective. That is, in the second mode, user inputs may be indicative of adjustments to flight parameters movable object 10 in the user's perspective.

As used herein, the term "perspective" may refer to a convention with respect to which the position and movements of movable object 10 and other objects may be determined, observed, measured or quantified, controlled, or commanded. For instance, a perspective of movable object 10 may be or include the exemplary local coordinate system shown in FIG. 4A. The local coordinate system may allow movements of movable object 10 and movement commands to be perceived or defined from the perspective of movable object 10 (i.e., with respect to the local coordinate system). For example, the local coordinate system may be defined or established from a fixed point on movable object 10 (for example the center point of movable object 10) and in defined directions (for example with the X and Y axes pointing to middle points between rotary components 24 and the Z axis perpendicular to the X and Y axes), allowing movements and commands for movements of movable object 10 to be perceived, understood, characterized, or defined with respect to the fixed point and the local coordinate system. In this way, movements and commands for movements of movable object 10 may be definable and understandable independently of other coordinate systems, such as a reference coordinate system (e.g., global coordinate system, universal coordinate system, a positioning system coordinate system, etc.), as means for directly detecting movements of movable object 10 with respect to other perspectives or coordinate systems may not be available in all situations.

Movements and positions of other objects or features may also be described from the perspective of movable object 10 with respect to the local coordinate system. For example, relative positions (e.g., distances, orientations, etc.) and relative movements (e.g., speeds, accelerations, rotations, etc.) of other objects, such as personnel, landscape features, vehicles, buildings, etc., may be described from the perspective of movable object 10 with respect to the local coordinate system. In this way, the local coordinate system may be used to generate control signals for commanding movable object 10 to achieve desired changes to the relative position, speed, and/or acceleration of movable object 10 with respect to other objects.

Commands for moving movable object 10 may be received from any suitable source, such as a user, which may have its own perspective of the position and movements of movable object 10 with respect to itself or other objects. Alternatively, commands for moving movable object 10 may be received from a reference perspective associated with the user or another command source.

Figure 4B:
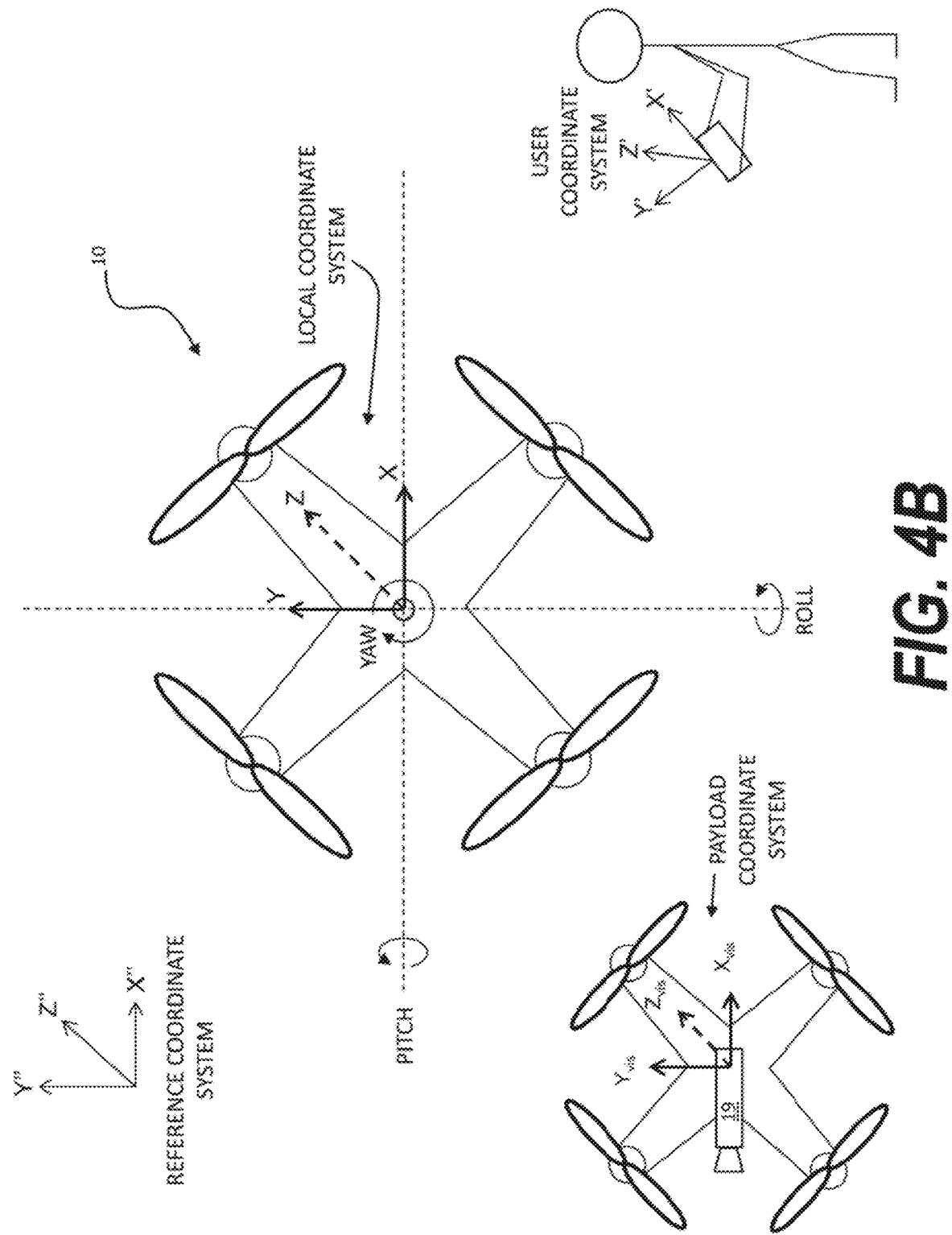

For example, and with reference to FIG. 4B, other perspectives relevant to movement control of movable object 10 may include a perspective of an operator or user, a perspective of payload 14, and or other perspectives. For instance, as shown in FIG. 4B, the user's perspective may be or include a user coordinate system. The user coordinate system may be a 3-axis coordinate system (e.g., X'-axis, Y'-axis, Z'-axis) and similar to the local coordinate system but defined instead from a point of view of the user, which may allow positions and movements (and commands for changing the positions and movements) of movable object 10 to be perceived, understood, characterized, or defined with respect to the user's perspective. In this way, movements and commands for movements of movable object 10 may be definable and understandable independently of other coordinate systems and perspectives. The point of view and perspective of the user and the user coordinate system may be defined or established with respect to an aspect of the user, such as an operator station (e.g., a control terminal, an input device for receiving user input, an operator's seat, a remote control used by the operator, etc.) or a fixed point on the user.

Other perspective may include a reference perspective that is associated with a reference coordinate system. The reference perspective may be associated with personnel, equipment, or other objects that participate in controlling movement of movable object 10. For example, the reference perspective may be the perspective of a management or control facility, the perspective of a server or computer used to carry out control processes, or the perspective of a sensory device used in a movement control process, such as a positioning system or positioning device (e.g., a GPS device). It is understood that other reference perspectives may be possible and are not limited to the above-mentioned perspectives.

As also shown in FIG. 4B, other perspectives may include the perspective of payload 14, carrier 16, or sensor devices 19 attached thereto, which, for sake of simplicity and convenience of this disclosure, may be referred to as a payload perspective. The payload perspective may be associated with a payload coordinate system. The payload coordinate system may have 3 axes (e.g., $X_{vis}$, $Y_{vis}$, and $Z_{vis}$) and be similar to the local coordinate system but defined instead from a point of view of payload 14, carrier 16, or sensory devices 19 attached thereto, which may allow positions and movements (and commands for changing the positions and movements) of movable object 10 to be perceived, understood, characterized, or defined with respect to the payload perspective.

Figure 5A:
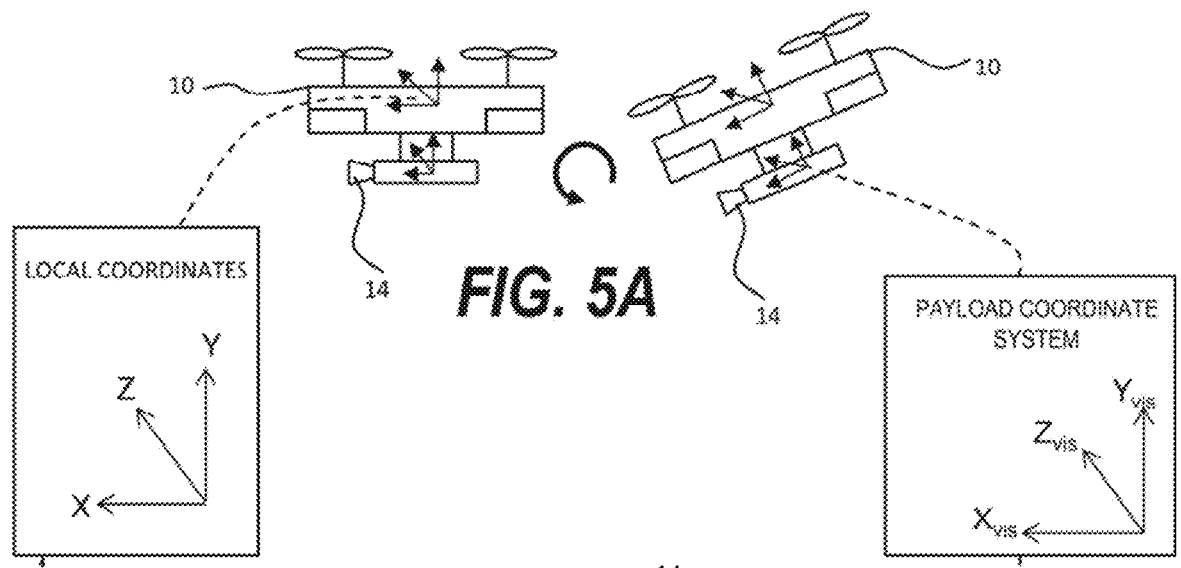
FIGS. 5A-5C show movable objects with payloads consistent with embodiments of the present disclosure.
Figure 5B:
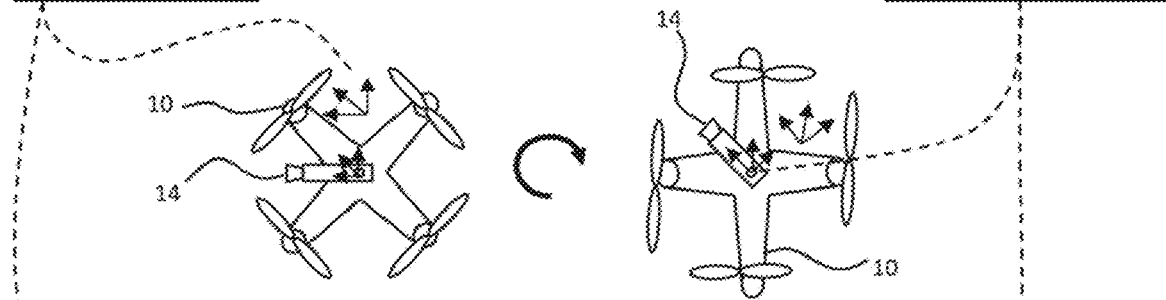
Figure 5C:
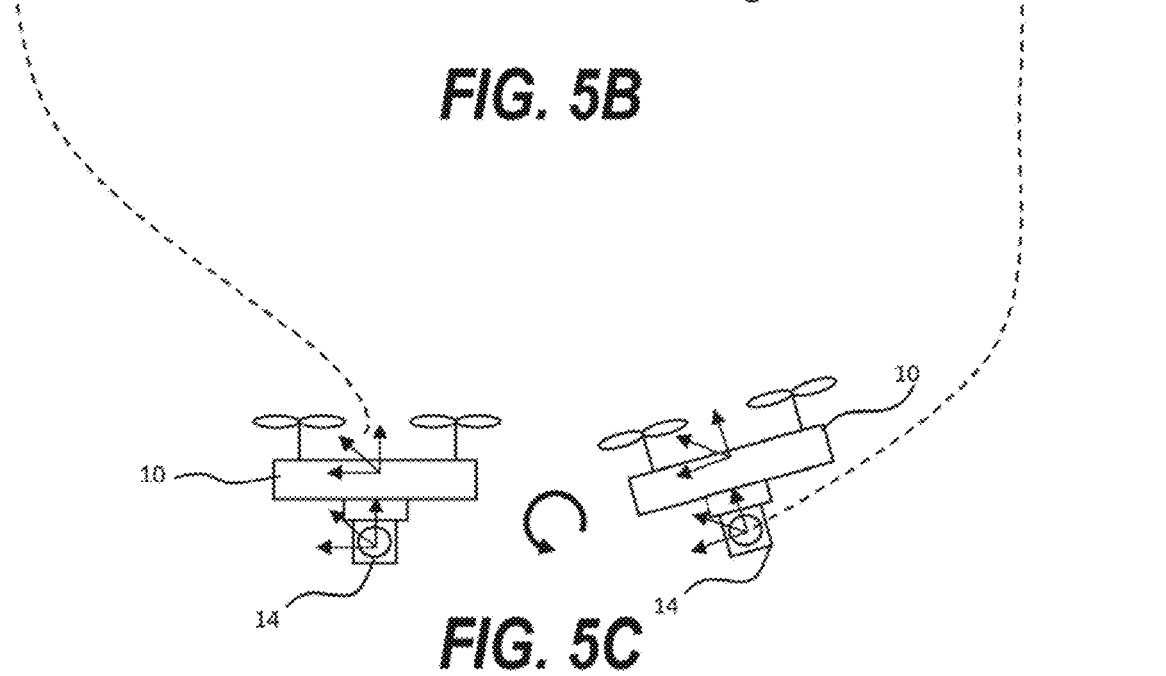

The payload perspective may differ (i.e., be offset from) the perspective of movable object 10 any time payload 14 or its components (e.g., carrier 16 or sensory devices 19) move with respect to movable object 10. Referring to FIGS. 5A-5C, when payload 14 is directly fixed to movable object 10 (i.e., without carrier 16 or with carrier 16 in a fixed orientation), the perspective of payload 14 (e.g., perspective in the payload perspective coordinate system defined with three axes $X_{vis}$, $Y_{vis}$, and $Z_{vis}$) may be the same as the perspective of movable object 10. Alternatively, payload 14 may be directly mounted to movable object 10 such that a known or determinable (e.g., measurable, calculable, etc.) fixed offset between the perspective of payload 14 and the perspective of movable object 10 may exist, which may allow for a simple relationship between movements or commands for movements of movable object 10 and movements perceived from payload 14. For example, as shown in FIG. 5A, payload 14 may rotate about a first axis with movable object 10 when movable object 10 is tilted during flight. Similarly, as shown in FIG. 5B, payload 14 may rotate with movable object 10 about a second axis as movable object 10 is rotated during flight. And as shown in FIG. 5C, payload 14 may rotate with movable object 10 as movable object 10 is tilted during flight. As used herein, an offset in the context of differences between a first perspective (e.g., having a first coordinate system) and a second perspective (e.g., having a second coordinate system) may refer to an angular difference (i.e., an angle or angular displacement) between at least one aspect the first perspective (e.g., at least a first axis of the first coordinate system) and at least one aspect of the second perspective (e.g., at least a first axis of the second coordinate system).

Figure 6A:
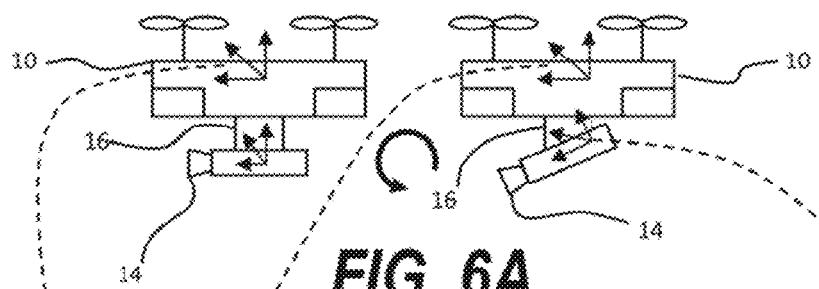
FIGS. 6A-6C show movable objects with carriers and payloads consistent with embodiments of the present disclosure.
Figure 6B:
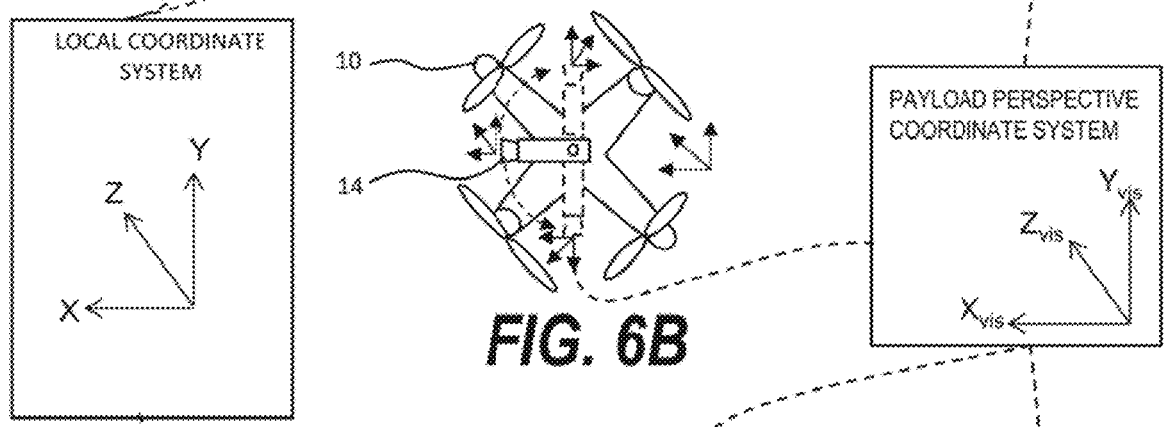
Figure 6C:
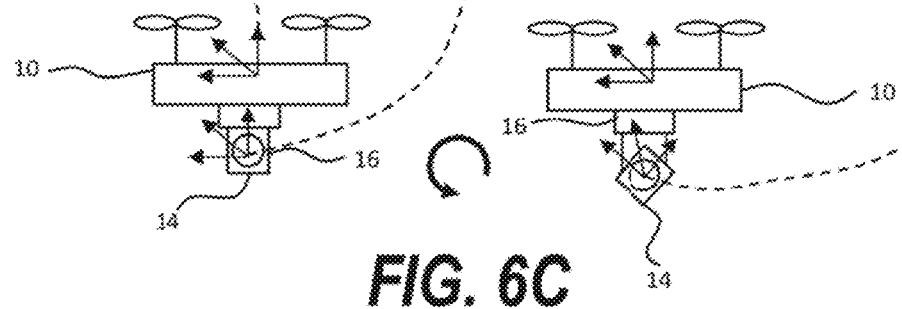

When payload 14 is attached or connected to movable object 10 via adjustable carrier 16, the perspective of payload 14 may vary with respect to the perspective of movable object 10. For example, with reference to FIGS. 6A-6C, carrier 16 may permit payload 14 to rotate about one or more axes (e.g., $X_{vis}$, $Y_{vis}$, and/or $Z_{vis}$ axis) in the payload coordinate system. For example, as shown in FIG. 6A, payload 14 may rotate independently about a first axis, such as $X_{vis}$ regardless of the orientation of movable object 10. Similarly, as shown in FIG. 6B, payload 14 may rotate independently about a second axis, such as $Z_{vis}$, regardless of the orientation of movable object 10. And as shown in FIG. 6C, payload 14 may rotate independently about a third axis, such as $Y_{vis}$, regardless of the orientation of movable object 10. In this configuration, movement of payload 14 about one or more of its axes and/or in combination with movement of movable object 10 about its axes may allow users to adjust the perspective of payload 14 with high precision. The ability to precisely control the perspective of payload 14 may be particularly important when movable object 10 is configured to carry optical equipment (e.g., photographic cameras, video cameras, sensors, etc.) to capture imaging data, such as in a professional photo or video shoot.

Figure 7:
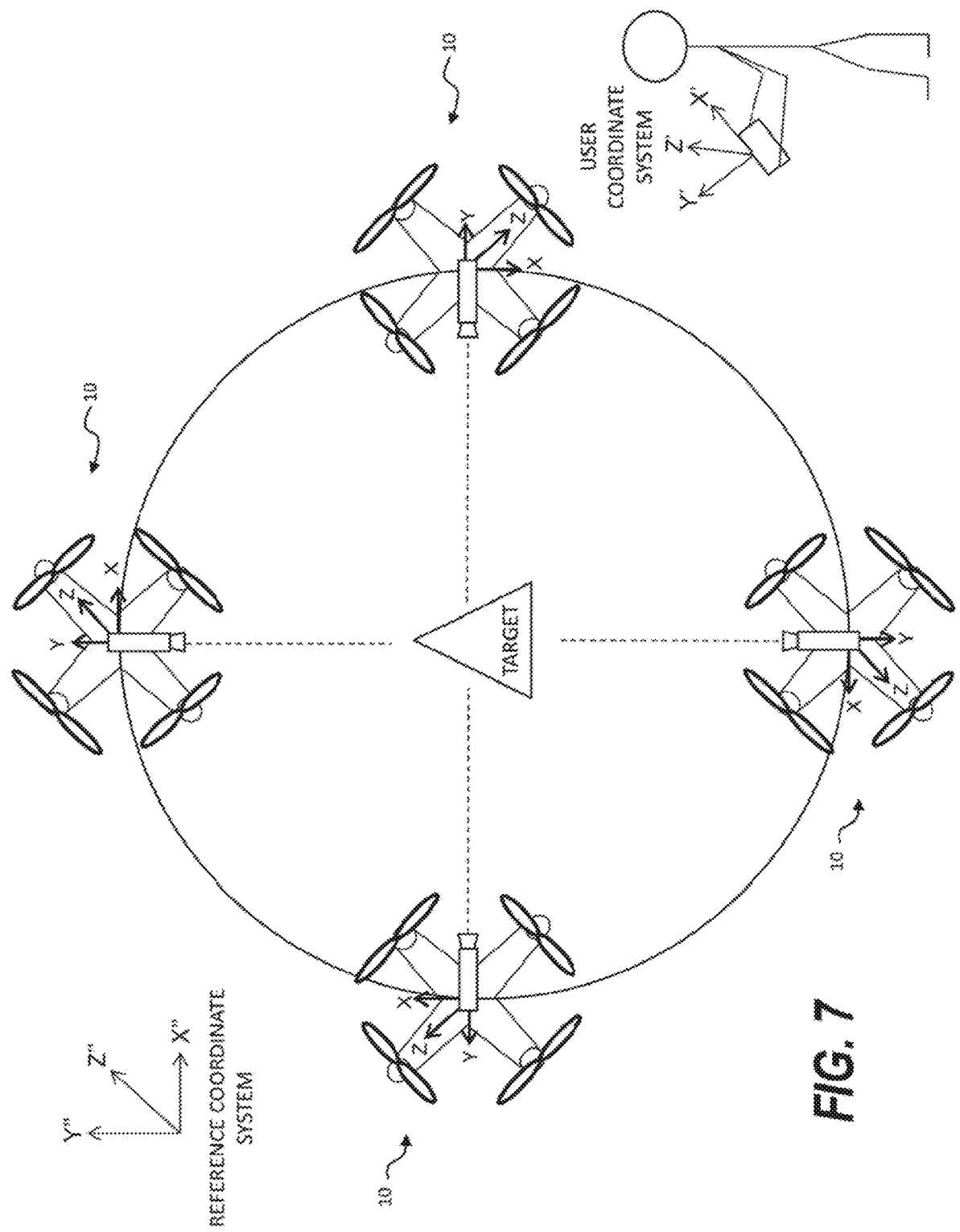
FIG. 7 shows operations of a movable object consistent with the present disclosure.

With reference to FIG. 7, the user may be positioned at a first location where the user may be able to control and observe movements of the movable object 10. Movable object 10 may be tracking and capturing a video or photo of a target while circling the target. Most of the time, the perspective of movable object 10 (i.e., the local coordinate system of movable object 10) is offset from the perspective of the user (i.e., the user coordinate system). A command entered by the user to indicate, for example, a forward translational movement causes a forward translational movement of movable object 10 in the perspective of movable object 10 so that movable object 10 moves closer to the target, but such movement does not necessarily appear to be a forward translational movement in the user's perspective. In other words, when there is an offset between the perspectives of the user and the movable object 10, directional commands generated by the user to cause movements in certain directions in the perspective of movable object 10 in fact, counterintuitively, appear to cause movements in different directions as perceived by the user than what the user may have expected.

Figure 8:
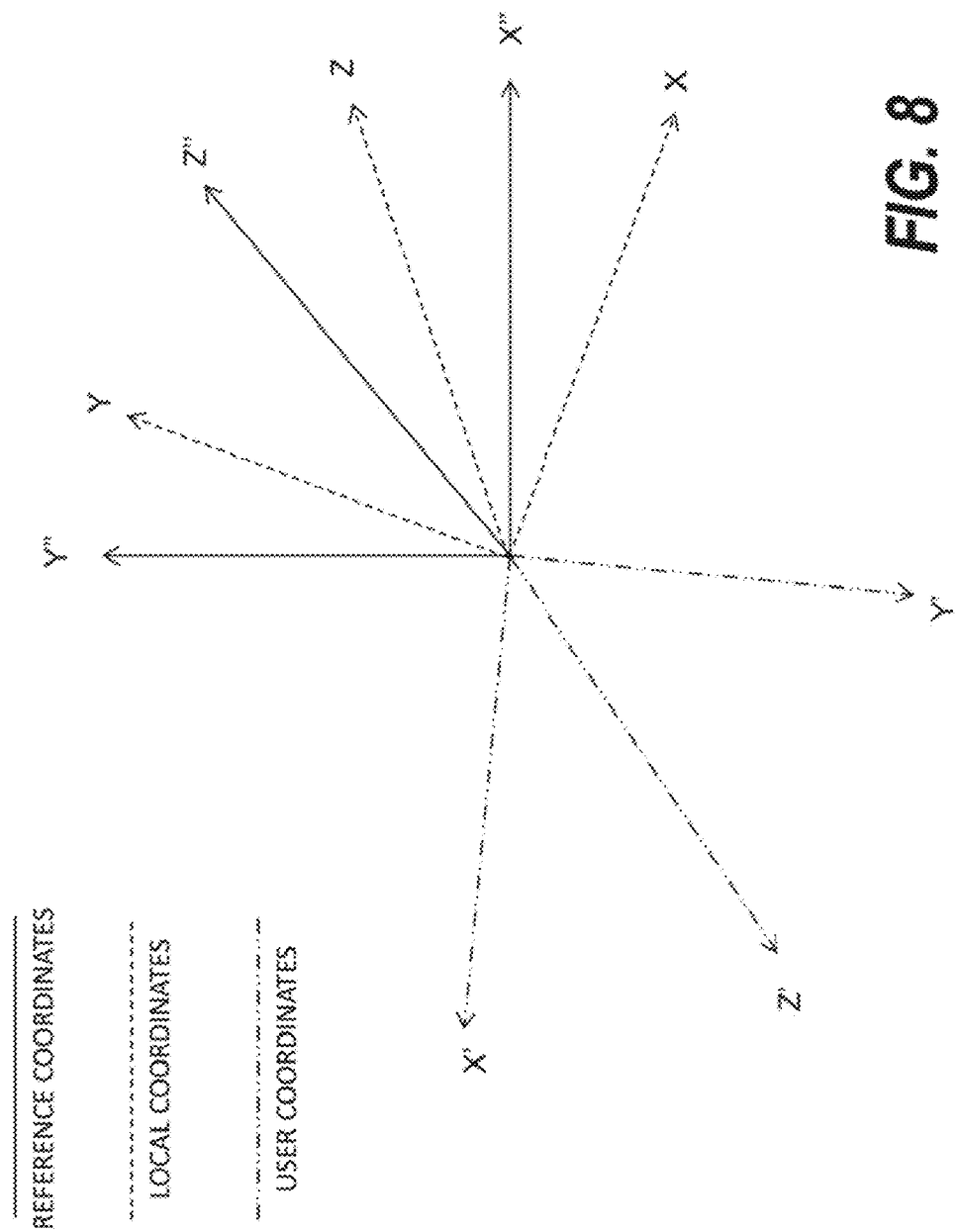
FIG. 8 shows coordinate systems that may be used with embodiments of the present disclosure.

FIGS. 8 and 9A-9B help illustrate the inconsistency between the user's expectation and perception caused by the offset between coordinate systems. FIG. 8 shows three coordinate systems, each having an offset from the others. When all axes are aligned, perception from one coordinate system will be the same as from the other, which can allow commands generated in a first coordinate system to produce the same movements of movable object 10 in other coordinate systems as would be perceived from the first coordinate system. However, when the coordinate systems are offset from each other, a command to cause movement along an axis of a first coordinate system (e.g., in the positive X direction of the user coordinate system) may generate movement in a different direction with respect to another coordinate system (e.g., the positive X direction in the local coordinate system). During fast pace and/or complicated flight maneuvers, perception of movement from the perspective of the user can be difficult to reconcile with the resultant movement from the perspective of the movable object.

As shown in FIG. 9A, when the user coordinate system and the local coordinate system of movable object 10 are aligned, resultant movement in the coordinate system of movable object 10 matches the desired movement in the user coordinate system. But when the user coordinate system and the local coordinate system of movable object 10 are offset, the user's commands may cause movable object 10 to move in a different direction than what the user desired in his/her perspective. The difference between the desired movement and the resultant movement as perceived varies with the degree of offset between the user's perspective and the perspective of movable object 10.

Consistent with embodiments of the present disclosure, to help users achieve desired movements of movable object 10 during flight, especially in situations where the user's perspective is offset from the perspective of the movable object, controller 22 may be configured to translate user inputs from the user's perspective into the perspective of movable object 10. For example, referring to FIG. 9B, a signal 80 from terminal 32, such as a signal for movable object 10 to move along or rotate about the yaw axis is assumed to be from the user's perspective, i.e., a signal along the Z' axis in the user coordinate system. Controller 22 translates signal 80 into the perspective of movable object 10 and generates three components 80-X, 80-Y, and 80-Z along the X, Y, and Z axes of the local coordinate system, respectively. The three components may then be used to command or cause corresponding movements along the X, Y, and Z axes.

By assuming user input on terminal 32 to be from the user's perspective and translating the user input into the perspective of movable object 10, controller 22 and the system consistent with embodiments of the present disclosure allow users to disregard any offset between the two perspectives and simply indicate a desired movement of movable object 10 from his/her own perspective. For example, if a user wants movable object 10 to move up and forward, i.e., up and away, from his/her perspective, the user may simply tilt a pitch stick on terminal 32. Traditionally, this user input on terminal 32 would be received by movable object 10 as a command to move in a pitch direction in the perspective of movable object 10. With the translation by controller 22, movable object 10 would instead move up and forward from the user's perspective, as if movable object 10 has now assumed the user's perspective, when the movement in fact may encompass movements in some or all of yaw, roll, and pitch directions in the perspective of movable object 10.

Controller 22 may perform the translation between the two perspectives through matrix transformation, e.g., by constructing a matrix representation of the user input (i.e., in terms of the user coordinate system) and transforming the matrix into a command matrix representation of the user input (i.e., in terms of the local coordinate system) based on the offset between the user's perspective and the perspective of movable object 10.

Figure 10:
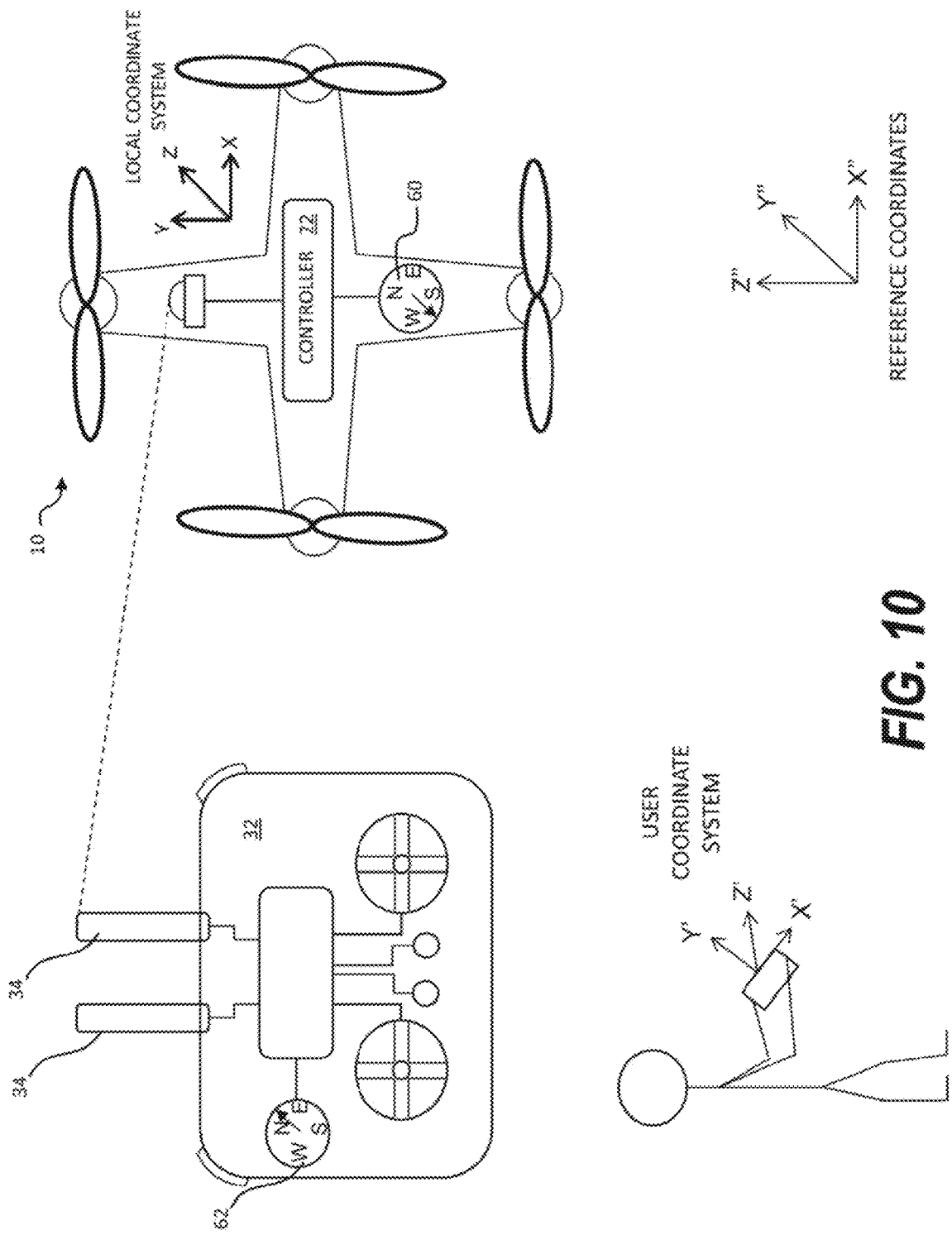
FIG. 10 shows a system for controlling a movable object consistent with the present disclosure.

The difference or offset between the user perspective and the perspective of the movable object may be determined in a number of ways. In one example, as shown in FIG. 10, controller 22 may be configured to determine a direction of at least one axis of the user coordinate system and a direction of at least one axis of the local coordinate system based on one or more inputs indicative of a direction of each respective axis with respect to a reference direction. For instance, controller 22 may be configured to receive a first directional signal indicative of the direction of the first axis of the local coordinate system of the movable object. Controller 22 may receive the first directional signal from a first directional indicator, such as a compass, a positioning device, or an inertial measurement unit.

As shown in FIG. 10, a first directional indicator 60 may be positioned on or within the movable object 10 and in communication with controller 22. Directional indicator 60 may be configured to generate a signal indicative of a reference direction (e.g., a compass heading or other reference directions) and communicate the reference direction to controller 22. Controller 22 may be configured to determine that the reference direction is the direction of the first axis of the local coordinate system and store the direction within memory for further processing.

Controller 22 may be further configured to receive a second directional signal indicative of the direction of the first axis of the user coordinate system. The controller 22 may receive the second directional signal from a second directional indicator, such as a compass, a positioning device, or an inertial measurement unit. As also shown in FIG. 10, a second directional indicator 62 may be positioned at any location where a user may be able to be positioned or controlling movement of the movable object. For example, second directional indicator 62 may be located on or within terminal 32 and be in electronic communication with controller 22 (e.g., via communication system 20). Second directional indicator 62 may be configured to generate a signal indicative of a second reference direction (e.g., a compass heading or other reference directions) and communicate the second reference direction to controller 22. Controller 22 may be configured to determine that the reference direction is the direction of the first axis of the user coordinate system and store the direction within memory for further processing.

Controller 22 may be configured to perform a mathematical comparison of the first reference heading indicated by first directional indicator 60 from the second reference heading indicated by second directional indicator 62 to determine the offset between the local coordinate system of the movable object 10 and the user coordinate system. In this way, the controller may be able to determine a directional (e.g., an angular) offset between a command generated in the user's perspective (i.e., with respect to the user coordinate system) and a resultant movement of the movable object 10 in the user's perspective based on the command. This offset may then be applied to commands generated in the user's perspective using a perspective transformation to obtain a corresponding command in the perspective of the movable object 10.

Similar mechanisms may be included in movable object 10 and terminal 32 to identify two other axes of the respective coordinate systems and allow controller 22 to determine the difference or offset for each corresponding pair of axes.

Once the 3-dimensional offset is determined, controller 22 may generate a transformation matrix to represent such offset, as follows:

$$T = \begin{vmatrix} \alpha_{xx'} & \beta_{xy'} & \gamma_{xz'} \\ \alpha_{yx'} & \beta_{yy'} & \gamma_{yz'} \\ \alpha_{zx'} & \beta_{zy'} & \gamma_{zz'} \end{vmatrix} \quad [1]$$

Controller 22 would then convert a user input r on terminal 32 would then be converted through a matrix transformation to generate a signal s in the perspective of movable object 10:

$$S = T \cdot r \quad [2]$$

where r and T are both 3-dimensional signals.

The translation or transformation described above may take into account the nature of the signal or command a user inputs on terminal 32, i.e., whether the user desires for movable object 10 to make a translational or rotational movement.

Figure 11:
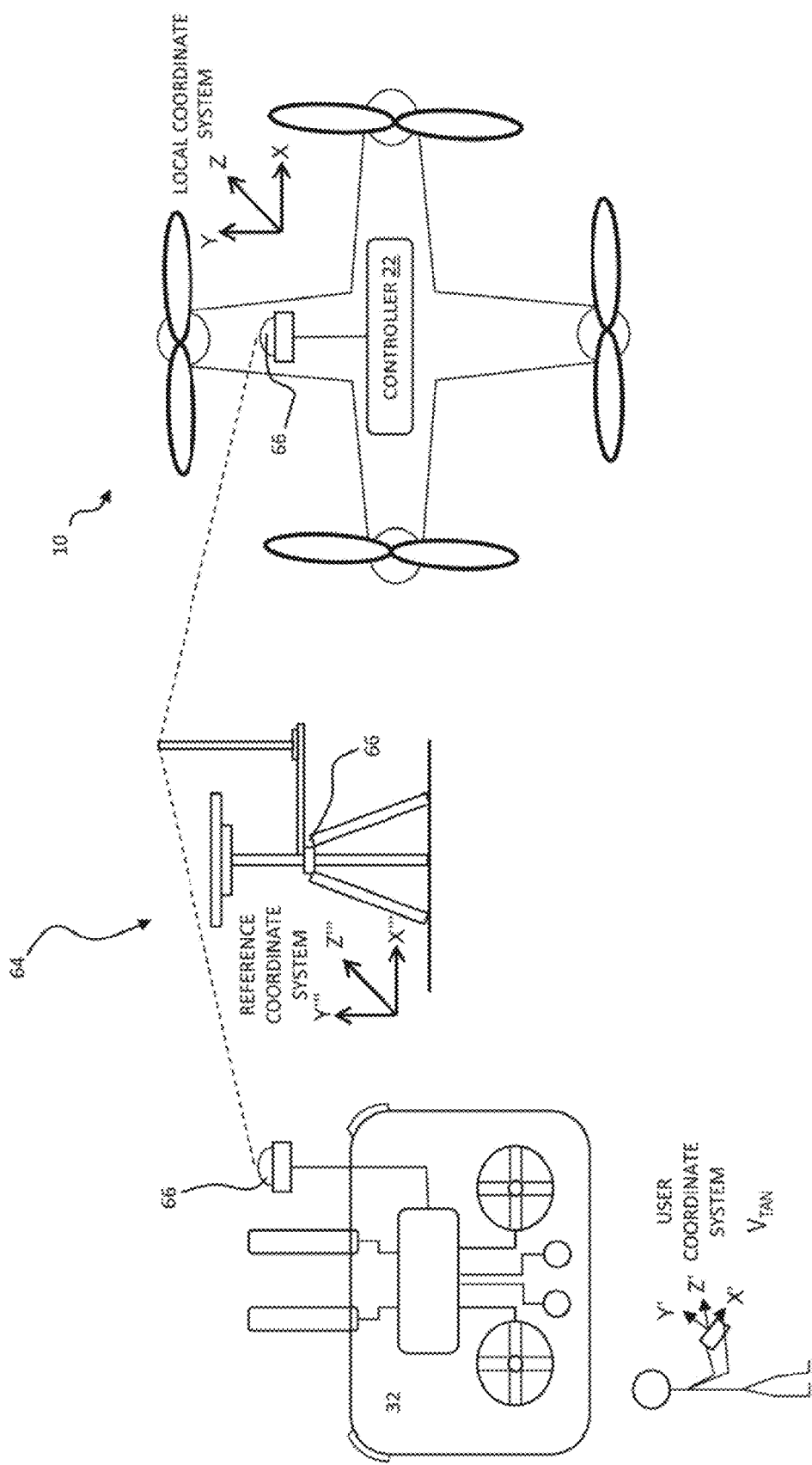
FIG. 11 shows a system for controlling a movable object consistent with the present disclosure.

FIG. 11 shows another exemplary embodiment for determining the offset between the perspective of the movable object 10 and the user's perspective. In the example shown in FIG. 11, controller 22 may be configured to determine the offset between the perspective of the movable object 10 and the user perspective based on input from a positioning system 64. Controller 22 may be in communication with a positioning system 64 (e.g., via communication system 20) and configured to track the location of movable object 10 and a reference point of the user perspective (e.g., terminal 32) with respect to a reference coordinate system. That is, the reference point of the user's perspective and movable object 10 may each include a positioning device 66 configured to receive and/or generate positioning signals usable by the locating system 64 to determine the location and/or movements of movable object 10 and the reference point of the user perspective (e.g., terminal 32).

The positioning system 64 may be configured to communicate the locations of movable object 10 and the reference point of the user perspective (e.g., terminal 32) to controller 22. Using this information, controller 22 may carry out an orientation process in which flight parameters (e.g., command signals for roll, pitch, and yaw) of movable object 10 are tested to determine how movable object 10 responds directionally with respect to the reference coordinate system to commands received in the perspective of movable object 10 (i.e., in the local coordinate system). The results of the orientation sequence may allow controller 22 to determine the direction of at least one axis of the local coordinate system with respect to the reference coordinate system. The direction of a first axis of the user coordinate system may be assumed or initially aligned with tracking components of the positioning system 64 to allow for the direction of a first axis of the user coordinate system to be understood by controller 22. Controller 22 may then be able to determine the difference (e.g., an angular difference) between the local coordinate system and the user coordinate system in the same manner as described above as described above.

Another exemplary method of determining the direction of at least one axis of the local coordinate system of movable object 10 and the user coordinate system for determining an offset between the two coordinate systems includes initially aligning the two coordinate systems and tracking their subsequent movements in a single coordinate system. For example, at the beginning of a flight operation, the user may align his or her perspective with a known direction of at least one axis of the local coordinate system of the movable object 10. For instance, the user may stand in front of, behind, or adjacent to the movable object 10 before the beginning of flight to orient himself or herself to the known axis direction of the movable object. The user may then provide an input indicative of an alignment calibration (e.g., button 42) or simply begin operating movable object 10. At this time, controller 22 may begin to track the movements of movable object in each direction of the local coordinate system during flight based on a directional indicator, such as an inertial measurement unit. Using the signals from the directional indicator, the controller may be able to determine the angular displacement of at least one axis of the local coordinate system with respect to its initial position at the beginning of flight. This difference may be indicative of a current direction of the at least one axis of the local coordinate system. In this way, the controller may be configured to determine that the difference between the initial direction and the current direction is the offset of between the local coordinate system and the user coordinate system, assuming that the user coordinate system is still aligned with the initial direction at the beginning of flight or at calibration.

In addition or alternatively, embodiments of the present disclosure may provide for user inputs not necessarily with respect to the multi-axis user coordinate system, but rather natural commands, such as for movable object 10 turn left or right from the user's perspective, regardless in which direction movable object 10 is headed. Controller 22 may be configured to translate such user commands into signals into the perspective of movable object 10, e.g., its local coordinate system, to effect a change in flight behavior corresponding to the user's demand. For example, a user input desiring a greater height may be translated into a pitch command for the head of movable object 10 to turn up. Often, the user input would be translated into some combination of linear and/or rotational movements, such as pitch, yaw, speed change, etc., as in a case of target tracking.

Target tracking is useful in many situations, such as surveillance and film shooting or video shooting, where a camera loaded on movable object 10 is shooting a moving target, and movable object 10 may be able to follow the target and sometimes move around the target to give the camera different view angles. Particularly in professional filmography and videography, target tracking offers the advantage that a user may only need to be concerned with controlling the flight of movable object 10, while movable object 10 automatically follows the target and makes sure the target stays in sight for the filming, leading to more precise flight control and consequently higher quality of imaging results (e.g., photos and videos).

Controller 22 may be configured to utilize the input from sensing system 18 to identify and/or track targets during flight. Tracking a target during flight may include identifying a target and maintaining the target in a field of sight of the movable object even while the target and/or movable object 10 is moving. Maintaining the target within the tracking view of movable object 10 may require movable object 10 to automatically adjust its flight parameters to keep sight of the target (i.e., in the perspective of movable object 10 or payload 14) while reconciling these tracking movements with the desired movement of movable object 10 commanded by the user (i.e., from the user's perspective or another reference perspective).

For example, with reference to FIG. 12, during target tracking, a user may position movable object 10 to achieve desired perception of the target and subsequently maintain that perception using flight tracking. To position movable object 10 to the desired perception, the user may initially control the flight of movable object 10 to a desirable position with respect to the target and then command movable object 10 to start tracking the target. Movable object 10 would then automatically adjust its flight parameters to maintain the target in view. Flight parameters to achieve and maintain target tracking may include relative position (e.g., linear, angular, etc.), speed (e.g., linear, angular, etc.), and acceleration parameters (e.g., linear, angular, etc.) of the movable object with respect to the target. In some embodiments, the desired flight parameters may be user specified. For instance, controller 22 may be configured to receive one or more input signals from the user via terminal 32, which signals may be indicative of a relative height and distance of movable object 10 to maintain with respect to the target during flight tracking. In other embodiments, the user may, as mentioned above, simply position the movable object so as to give movable object 10 a desired perception of the target, and provide an input indicative of a desire to track the target from that perception.

Inputs received by controller 22 from the user relating to target tracking may be received from the user's perspective and may then be translated to the perspective of movable object 10, in accordance with the exemplary processes discussed above, for generating control signals that cause movable object 10 to track the target from the desired position and with the desired movement characteristics (e.g., speed, acceleration, etc.) desired by the user. While movable object 10 is tracking the target, the user may wish to change one or more tracking parameters, such as the relative distance, speed, or acceleration between movable object 10 and the target, and generate commands via terminal 32 to cause such changes from the user's perspective. Such commands may correspond to changes in the perspective of movable object 10 or payload 14 (e.g., carrier 16, sensory devices 19, etc.) desired by the user. Controller 22 may be configured to receive, from the user's perspective, the commands indicative of the desired changes to the perspective of movable object 10 or payload 14, and translate the commands to the perspective of movable object 10, in accordance with the exemplary processes discussed above, for generating control signals that cause movable object 10 to track the target from the perspective desired by the user.

In some embodiments, controller 22 may be configured to receive an input signal from an input device, such as button 42 of terminal 32, as an indication to begin tracking at the current perception of the movable device. In other embodiments, target tracking may be automatically initiated by controller 22 based on other factors, such as being powered up, an elapsed period of operating time, indication of the presence of a trackable target, or any other suitable input.

During target tracking, controller 22 may be configured to make necessary adjustments to flight parameters (e.g., roll, pitch, yaw, throttle, etc.) in order to track the target, i.e., maintain the movable object's perception of the target. A perception of a target may refer to a characterization of a target by one or more perceived parameters corresponding to one or more determinable relative parameters between the movable object and the target. Determinable relative parameters may include, for example, relative positional and rotational parameters between movable object 10 and a reference point or reference object, such as the target, a ground surface, or another object. Relative positional parameters and rotational parameters may include a relative distance between movable object 10 and the target (e.g., a linear distance, a radial distance, an angular distance, a vertical distance, a horizontal distance, etc.) and a relative speed between the movable object 10 and the target (e.g., a linear velocity, an axial velocity, a radial velocity, a tangential velocity, and angular velocity, etc.).

Figure 13:
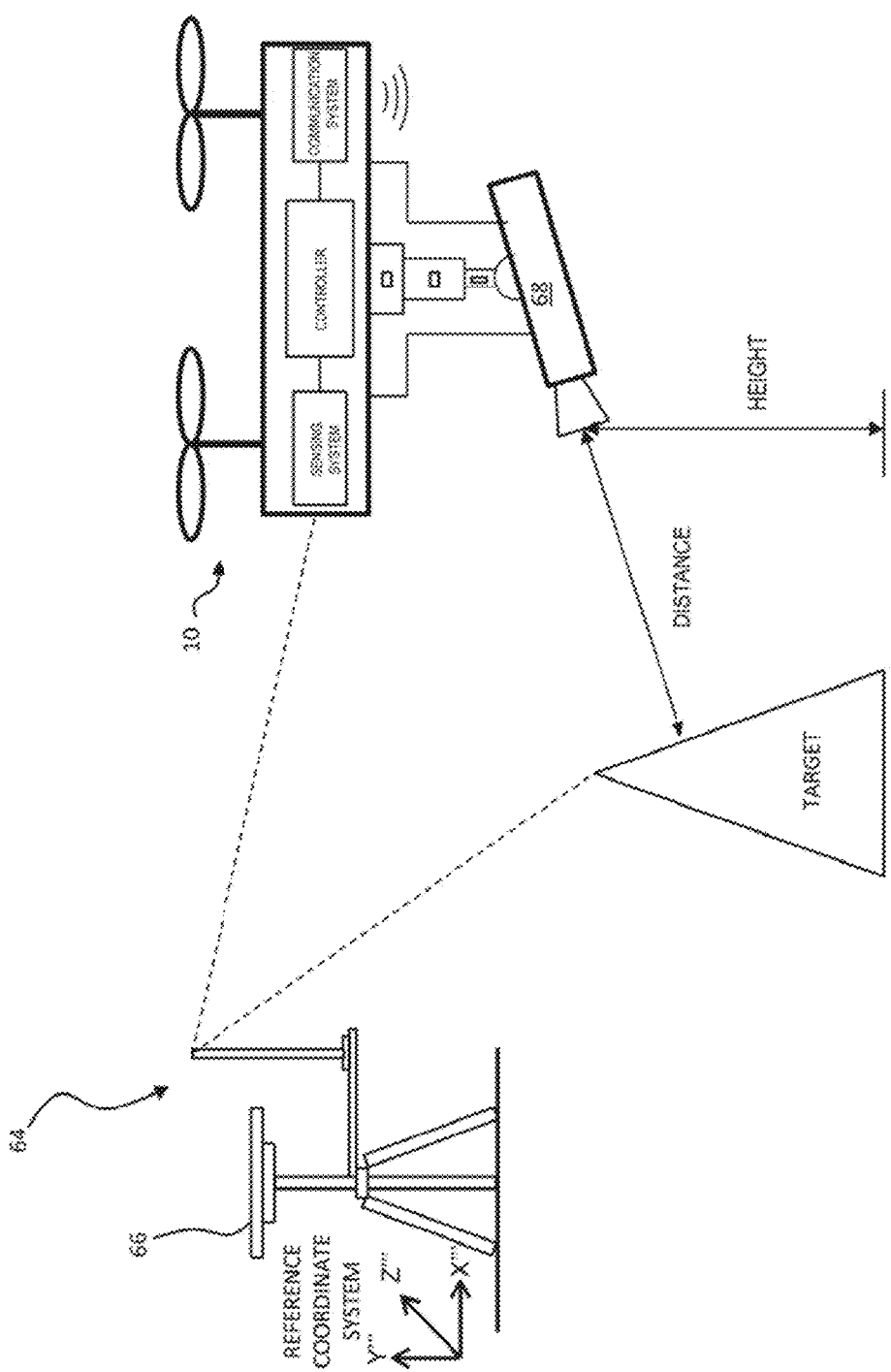
FIG. 13 shows a system for controlling a movable object while tracking a target consistent with the present disclosure.

Perceived parameters for characterizing a perception may vary depending on what method is used to perceive a target. For example, as shown in FIG. 13, controller 22 may be configured to receive signals indicative of perceived parameters from a positioning system 64. From the positioning system, controller 22 may be configured to constantly receive signals indicative of the location of the target and of movable object 10. Controller 22 may be configured to constantly compare the perceived position of the movable object 10 to the perceived position of the target to constantly determine, for example, the relative distance between the movable object 10 and the target, the relative speed between the movable object, and/or other relative parameters.

Figure 14:
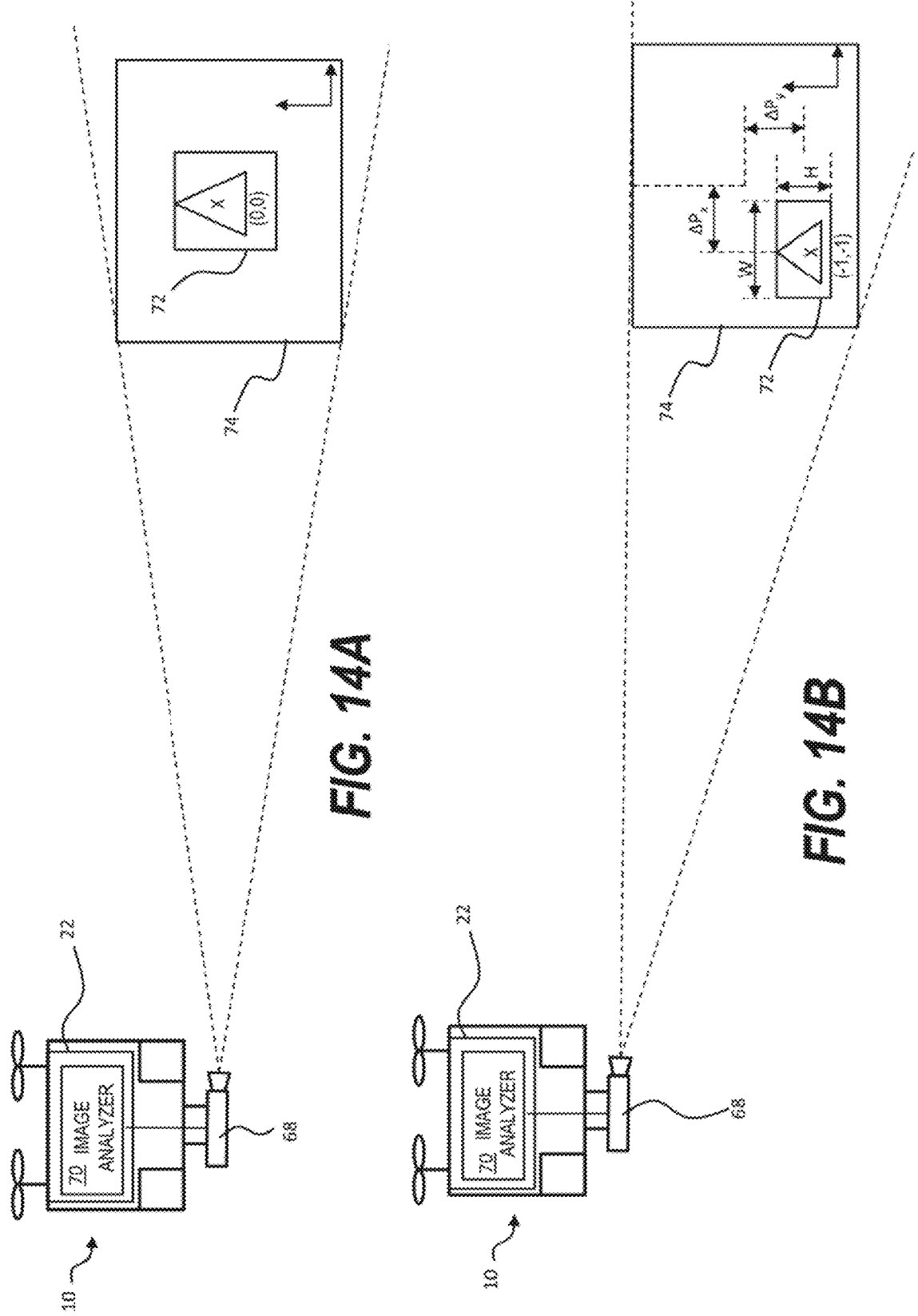
FIGS. 14A and 14B show systems for controlling a movable object while tracking a target consistent with the present disclosure.

In other embodiments, perceived parameter for characterizing the perception of a target may be determined using a computer visions system. For example, as shown in FIG. 14A, movable object may include an imaging device 68 supported by a carrier 16. The imaging device 68 may be configured to generate optical data of the target for identifying and tracking the target. For example, the imaging device 18 may be an optical device, such as a camera or video camera. The imaging device 68 may be configured to generate imaging data indicative of one or more features of the target, such as a height or width of the target. Controller 22 may include or be in communication with an image analyzer 70 configured to analyze iterations of imaging data to identify features of the target that may be used to determine relative parameters between the movable object 10 and the target. For example, image analyzer 70 may be configured to establish a bounding box 72 around the target and monitor how aspects of bounding box 72 changes. For example, as shown in FIG. 14A, bounding box 72 may begin near a center of an image window 74 in a first imaging iteration. In a second imaging iteration, as shown in FIG. 14B, image analyzer 70 may determine that the position of bounding box 72 in the image window 74 has moved by an amount $\Delta P_x$ in a horizontal direction and an amount $\Delta P_y$ in a vertical direction. Based on this information, image analyzer 70 may be configured to determine that a horizontal distance between the movable object 10 and the target has changed and in what direction. Further, the image analyzer 70 may be configured to observe changes in the height H and width W of the bounding box 72 to determine whether a relative height between the movable object 10 and the target changed.

Figure 15:
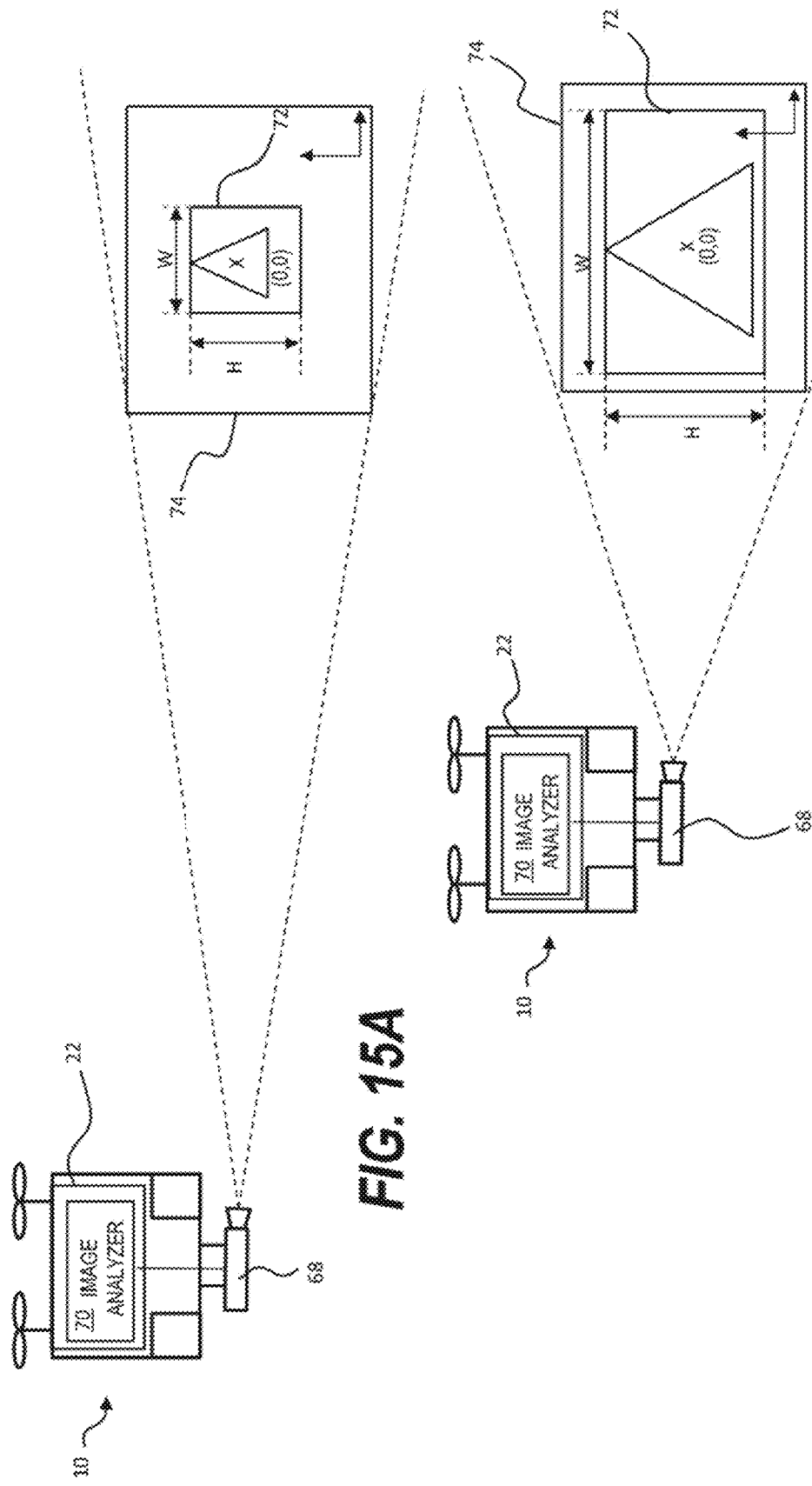
FIGS. 15A and 15B show systems for controlling a movable object while tracking a target consistent with the present disclosure.

As shown in FIG. 15A, image analyzer 70 may be configured to detect changes in the width W and height H of bounding box 72 and determine changes in the relative distance between the movable object 10 and the target. For example, as shown in FIG. 15B, as the movable object 10 gets closer to the target, the size of the bounding box 72 may increase in width W and height H. The image analyzer 70 may also be configured to determine the rate of change of feature of the bounding box 72 to determine relative speeds between the movable object 10 and the target.

FIGS. 15A and 15B show exemplary perceptions of the target from the perspective of the movable object 10. That is, bounding box 72 at a particular location within the image window 74 and having particular dimensions (e.g., width W and height H) may be indicative of a current perception of the target from the perspective of movable object 10. The current perspective of the target may also include relative linear, radial, tangential, and angular speeds of the movable object with respect to the target as determined by changes in bounding box parameters with respect to time. When the perception of the target from the perspective of the movable object 10 does not change, image analyzer 70 may be configured to determine that all relative parameters between the movable object 10 and the target are constant, and therefore that movable object 10 is currently tracking the target at the desired tracking parameters.

To maintain the current perception of the target from the perspective of movable object 10, controller 22 may be configured to automatically generate one or more control signals for adjusting flight parameters (e.g., roll, pitch, yaw, throttle, etc.) when changes in perception are detected. In one example, controller 22 may be configured to generate and directly apply control signals to cause the desired flight parameters to be achieved. In this example, controller 22 may simply generate commands that will cause movable object 10 to expediently achieve the desired perspective. This method may be referred to as a "brute force" method. In this situation, a user input indicating a longer tracking distance between movable object 10 and the target may, for example, be translated to flight controls signals for movable object to fly away from the target for a period of time and then restored to its previous flight pattern once the desired distance is achieved.

Figure 16:
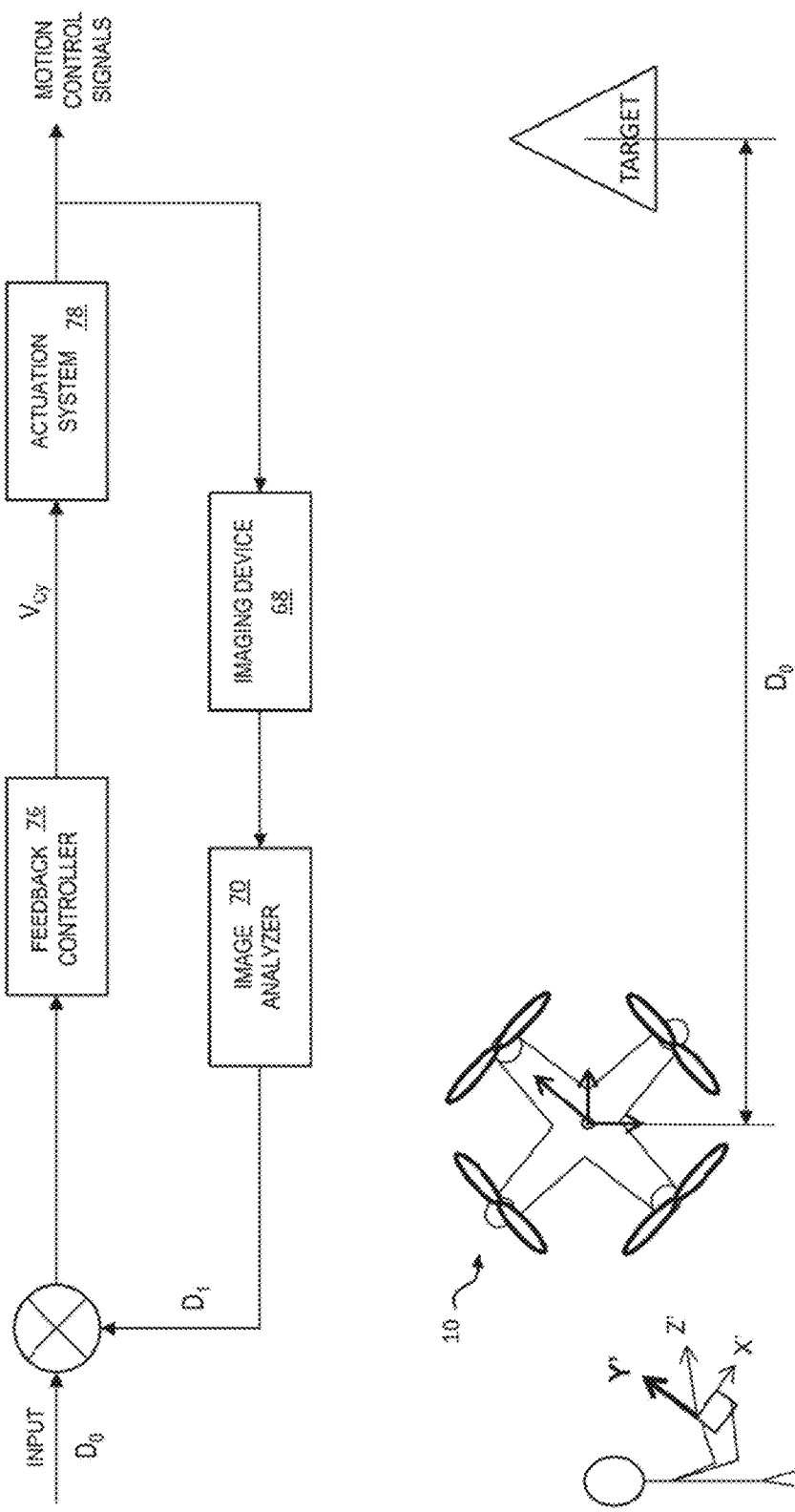
FIGS. 16-22 show systems for controlling a movable object while tracking a target consistent with the present disclosure.

In another example, as shown in FIG. 16, controller 22 may be configured to use feedback control of flight parameters to maintain the current perception of the target from the perspective of movable object 10 while providing for smoother movement and continued tracking during flight parameter adjustment. For example, image analyzer 70 may receive imaging data from imaging device 68 and determine a current relative distance Di between the movable object 10 and the target. Controller 22 may compare the current relative distance Di to an initial relative distance Do, which may be a desired relative distance or a relative distance from a previous iteration. A feedback controller 76 may be configured to determine whether there is a difference between the initial relative distance Do and the current relative distance Di. When the two are the same, movable object 10 is following at the correct distance and no change in flight parameters is necessary. When there is a difference, feedback controller 76 may be configured to determine a control speed $V_{Cy}$ for movable object 10 in the direction of the relative distance for adjusting the current relative distance to match the initial relative distance.

Feedback controller 76 may be configured to carry out feedback control using any suitable feedback process. For example, feedback controller may be configured to carry out proportional control (P), integral control (I), derivative control (D), proportional-integral control (PI), or proportional-integral-derivative control (PID). Feedback controller 76 may also or alternatively be configured to apply one or more mathematical filters to conduct or enhance feedback control processes. It is understood that other or additional feedback control and filtering processes may be used.

An actuation system 78 may be configured to generate motion control signals to one or more actuators for achieving the control velocity determined by feedback controller 76. The control signals generated by actuation system 78 may control a flight parameter, such as pitch, in order to cause the movable object to move closer or farther from the target to achieve the initial relative distance. This process may repeat a number of times until the initial or desired distance is achieved.

It is noted that the process shown in FIG. 16 and described above may be performed for other tracking control parameters in addition to the relative distance Do, such as a relative height, a relative radial distance, a relative axial distance, a relative angular displacement, a relative linear speed, a relative radial speed, a relative tangential speed, a relative vertical speed, etc. Whenever a difference is detected in one of the tracking control parameters, either between an initial value and the current value or between a desired value and the current value, the feedback process shown in FIG. 16 determines appropriate flight parameters for movable object 10, such as translational and/or rotational speed in the correct direction or about the correct axis, for reducing the difference between the initial and current parameters, and provides corresponding motion control signals to movable object 10 to achieve any necessary adjustment in the flight parameters. For instance, adjustments to roll, pitch, yaw, and throttle may be made to achieve determined control speeds along (i.e., translationally) or about (i.e., rotationally) any axis of movement of movable object 10.

During a photo or video shoot, the user may change the positional relationship with movable object 10 as well as the camera or other imaging equipment loaded thereon, and also possibly the positional relationship with the target, either because the user wants to change a perception of the shot or because of the movements of the target and movable object 10. Thus, the user may wish to have a controlled transition from a first perception to a subsequent perception and, once the movable object arrives at the subsequent perception, controlled maintenance of the subsequent perception to continue producing high quality imaging results.

As one example, the user may wish to change the perception by closing in on the perception of the target, i.e., shortening the distance between movable object 10 and the target. To do so, the user may simply actuate an input device, such as first or second input lever 38, 40 of terminal 32 to generate a command signal. Controller 22 may receive this user input and respond by adjusting one or more flight parameters corresponding to the user input to achieve the desired change in distance. But, the feedback control process shown in FIG. 16 is designed to maintain the initial or desired distance Do (or a desired perception of the target in the view of movable object 10). Any attempt to adjust the distance by simply changing the flight speed of movable object 10 would be negated by the works of the feedback control process.

Figure 17:
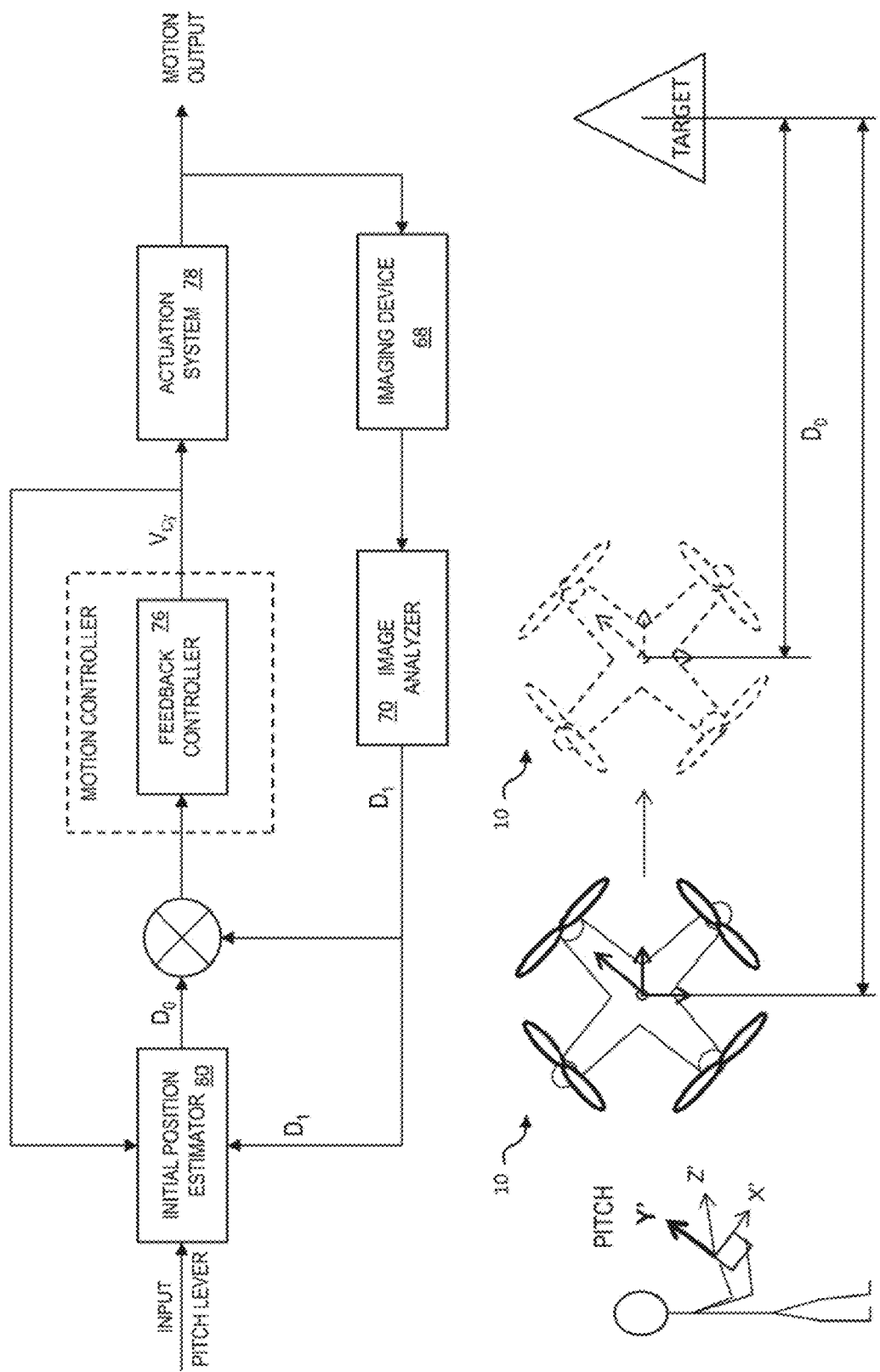

Consistent with embodiments of the present disclosure, controller 22 may be configured to determine a subsequent or future perception of the target from the perspective of movable object 10 based on the user's command to change a tracking parameter (e.g., the following distance), thereby adjusting the initial or desired tracking distance Do to allow the feedback control process to work in cooperation with the user to control movable object 10. For example, as shown in FIG. 17, controller 22 may be configured to perform a feedback control method similar to the method described above in connection with FIG. 16 to determine a subsequent or future perception of the target from the perspective of the movable object 10 using an initial position estimator 80. Initial position estimator 80 may be configured to receive data from the image analyzer 70 as well as the input from the user to determine what the future perception of the target from the perspective of the movable object 10 will be based on this information. In the example shown in FIG. 17, this process results in a modified initial or desired distance Do, after which the feedback control process will try to maintain that modified distance Do between movable object 10 and the target.

Figure 18:
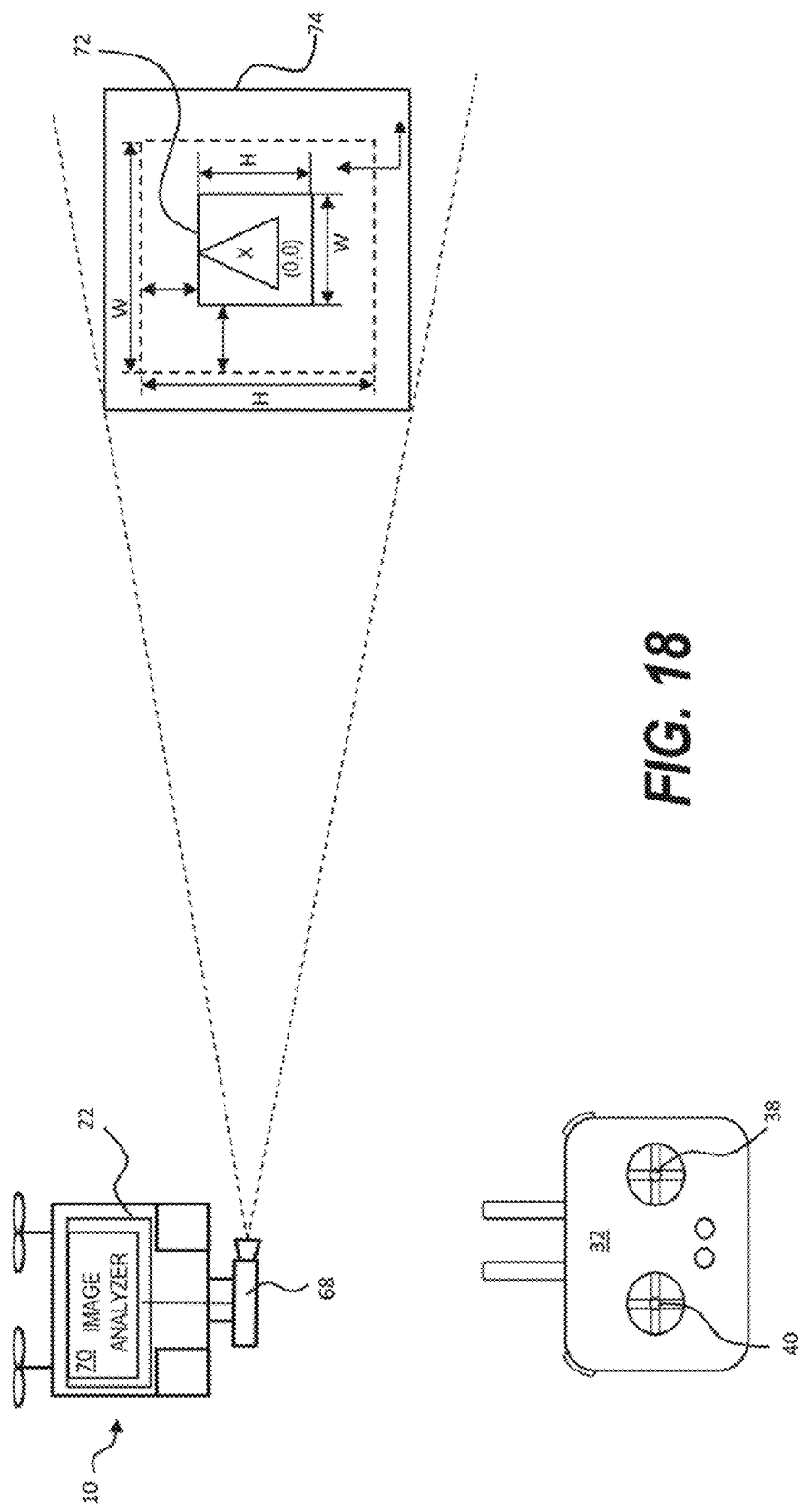
Figure 19:
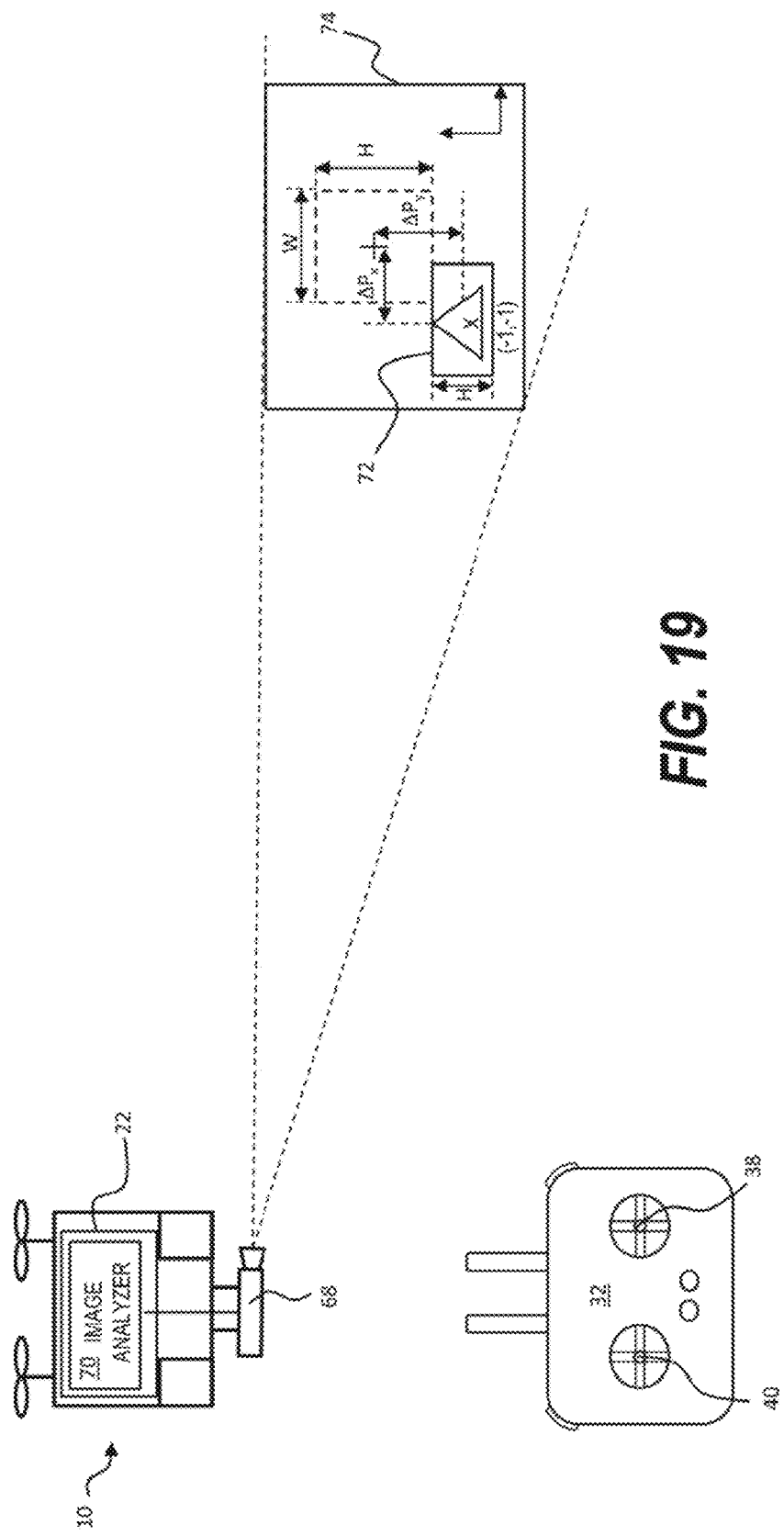

With reference to FIGS. 18 and 19, the user input may be a signal generated by an input device, such as first or second input lever 38, 40 of terminal 32. The generated signal may be correlated to changes in perception of the target, such as changes in size (e.g., width W and height H) of bounding box 72 and resulting corresponding changes in flight parameters (e.g., roll, pitch, yaw, throttle, etc.). In this way, initial position estimator 80 (FIG. 17) may be configured to determine a subsequent perception of the target that corresponds to a subsequent or desired difference in one or more relative parameters between the movable object and the target (e.g., a relative linear distance, a relative angular displacement, a relative height, a relative linear speed, a relative angular speed, a relative radial speed, a relative vertical speed, etc.).

With reference to FIG. 17, the subsequent relative parameter determined by initial position estimator 80 may then be compared to the corresponding current relative parameter (e.g., based on the current perception of the target), and the difference may be used in feedback control. In this way, a difference between the current perception and the subsequent perception may yield a difference between a subsequent relative parameter and a current relative parameter, and this difference in the relative parameters may be used to generate the control speed $V_{Cy}$ for moving movable object 10 to maintain the target (i.e., the bounding box 72) within image window 74 (referring to FIGS. 18 and 19) of image analyzer 70.

In some embodiments, the determined control speed $V_{Cy}$ may be fed back to the initial position estimator 80, and, during a subsequent iteration of the feedback control process, the initial position estimator 80 may be configured to re-determine the subsequent perception of the target based on the control speed to more accurately determine the subsequent perception of the target. For example, feedback controller 76 may determine a control speed for allowing relative parameters between the movable object 10 and the target to be changed based on the user's input command while simultaneously preventing the user's input command from moving the bounding box in the image window (referring to FIGS. 18 and 19) to prevent the tracking process from being stopped. Thus, the determined control speed may be a more realistic speed with which the movable object 10 will respond to the user's input. Accordingly, a more accurate estimation of the subsequent perception of the target may account for the fact that the subsequent perception will not actually be as different from the current perception as it would otherwise be if only the user input, and not the control speed, dictated the response of the movable object.

In some situations, the accuracy of perception and perception estimation can be further increased by translating perception information received sensory devices, such as imaging device 68, from the perspective of the sensory device to the perspective of the movable object 10. For example during some maneuvers, such as when circling the target, tracking in an arcuate path, or tracking the target while making somewhat sharp maneuvers (e.g., high-speed turns, steep banking turns, low radius turns, etc.), the ability of the carrier 16 to quickly adjust the payload 14 (i.e., the imaging device 68) for tracking the target can result in situations where the perception of the target from the perspective of the imaging device is slightly different from the perception of the target from the perspective of the movable object 10. When such is the case, the subsequent perceptions determined by initial position estimator 80 may be slightly inaccurate, which can cause the feedback controller 76 to determine slightly inaccurate control speeds for controlling the movable object 10 to during target tracking. To account for any offset in perspective between the imaging device 68 or carrier 16 and the movable object 10, the controller may be configured to receive perception information from the perspective of the imaging device 68 or carrier 16 and transform the perception information from the perspective of the imaging device 68 or carrier 16 to the perspective of the mobile object 10. In this way, subsequent perspectives and commands for controlling flight parameters may more accurately reflect the true perspective of the movable object 10.

To perform the perspective transformation, the controller of the movable object 10 may be configured to constructing a matrix representation of the sensory input in terms of a coordinate system associated with the imaging device 68 or carrier 16, and transforming the matrix into a matrix representation of the sensory input in terms of the local coordinate system of the movable object based on an offset between the perspective of the imaging device 68 or carrier and the perspective of the movable object 10. Techniques for determining the perspective offset as described above may be used.

Figure 20:
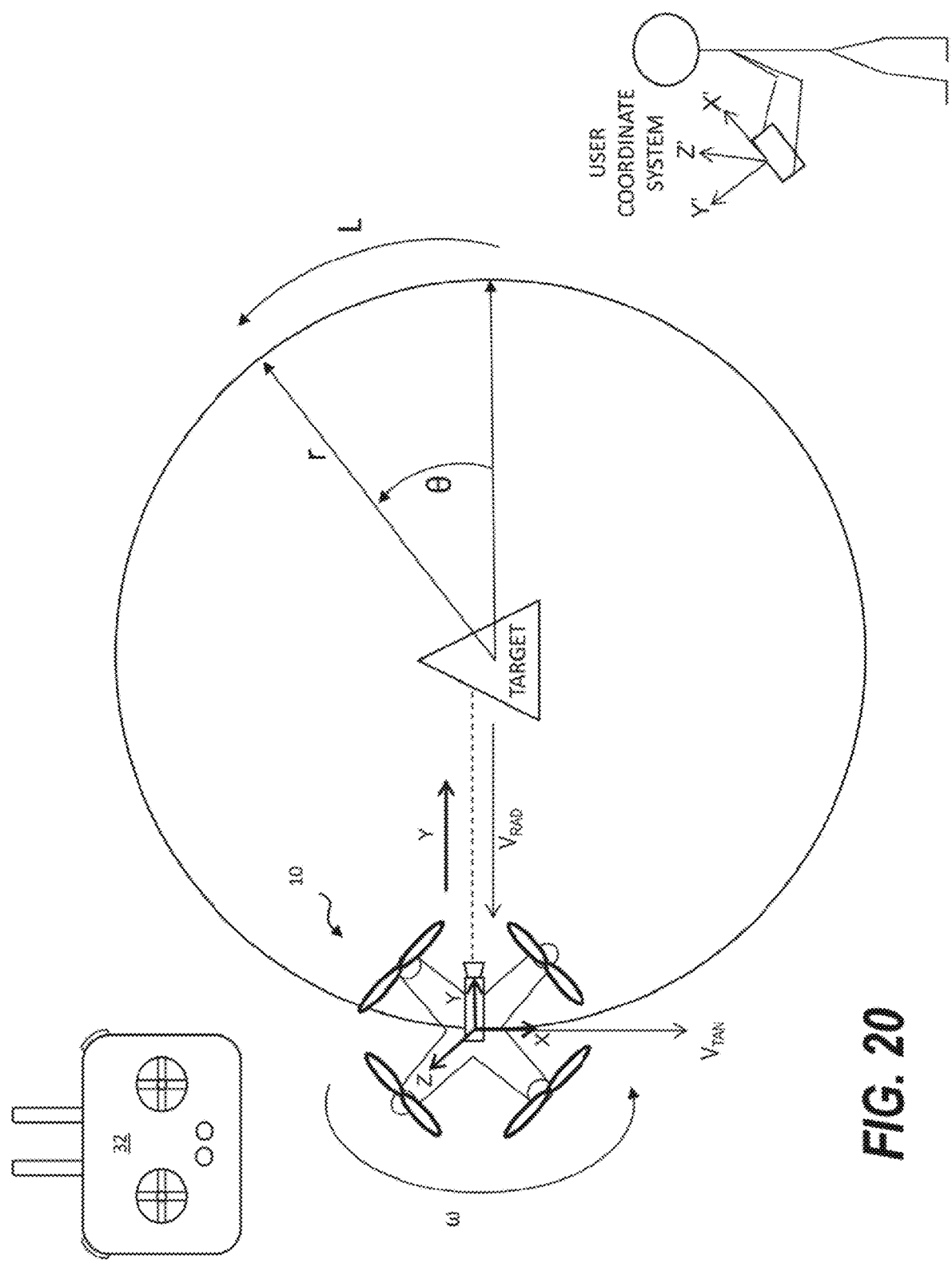

Sometimes movable object 10 moves around the target, for example, in circles, to provide the camera different view angles. FIG. 20 illustrates a situation where movable object 10 moves around a target in a circle with radius r, with a radial velocity component $V_{RAD}$, a tangential velocity component $V_{TAN}$, and an angular velocity $\omega$. The tracking control process described above in connection with FIGS. 16 and 17 may be employed to maintain or adjust the radius r. The user may wish to have movable object 10 move faster or slower for varying effects of the imaging results. Centrifugal forces associated with the circular movement, which pull movable object 10 outwardly in the radial direction, may be countered by the inward flight of movable object 10, e.g., via a pitch control. But the pitch amount, or a tilt angle, of movable object 10 has a physical limit, often because of the limit of how much carrier or gimbal 16 can tilt. If the tangential velocity $V_{TAN}$ exceeds a threshold $V_{Tmax}$, the pitch of movable object 10 will not be able to counter the centrifugal forces, which may ultimately throw movable object 10 off the circular track and result in a loss of track of the target.

To prevent users from exceeding the maximum allowable tangential speed $V_{Tmax}$, the controller of movable object 10 may be configured to determine the maximum allowable tangential velocity for sustaining target tracking and limit the ability of the user to increase the tangential velocity of the movable object 10 while tracking a target in a circular pattern. For example, controller 22 may be configured to first determine the radius r of rotation of movable object 10 about the target. One method for determining the radius r may include dividing an arc length L of travel by an angular displacement $\theta$ along the arc length, i.e., $$r = \left(\frac{L}{\theta}\right).$$

The arc length L of travel can be determined in a number of ways. For example, controller 22 may be configured to integrate the tangential velocity of movable object 10 over time to calculate the arc length L. And as discussed above, the tangential velocity of movable object 10 can be determined by analyzing image data collected by imaging device 68, such as perceived changes in the size, shape, and location of the target from the perspective of the imaging device 68. In other embodiments, data from sensory devices, such as a GPS system or an inertial measuring unit (IMU) may be collected and analyzed to determine the arc length L traveled by movable object 10 over a period of time. The angular displacement $\theta$ of the movable object 10 over the arc length L may be determined by analyzing image data collected by imaging device 68, such as perceived changes in the size, shape, and location of the target from the perspective of the imaging device 68 (i.e., an optical sensory device), as discussed above, or from infrared imaging devices, ultraviolet imaging devices, x-ray devices, ultrasonic imaging devices, radar devices, etc.

Another method for determining the radius r may be dividing the tangential velocity $V_{TAN}$ by the angular velocity ω of movable object 10, i.e., $$\left(\frac{V_T}{\omega}\right).$$

As discussed above, both the tangential velocity and the angular velocity of movable object 10 may be determined by comparing multiple perceptions of the target from the perspective of the movable object, the multiple perceptions being generated with data collected by imaging device 68 or other devices, such as infrared imaging devices, ultraviolet imaging devices, x-ray devices, ultrasonic imaging devices, radar devices, etc. Changes in the size, shape, and location of the target (i.e., the bounding box 72) determined during the comparison may correspond to values of tangential velocity and angular velocity, which may be used to determine the radius of rotation of movable object 10.

Figure 21:
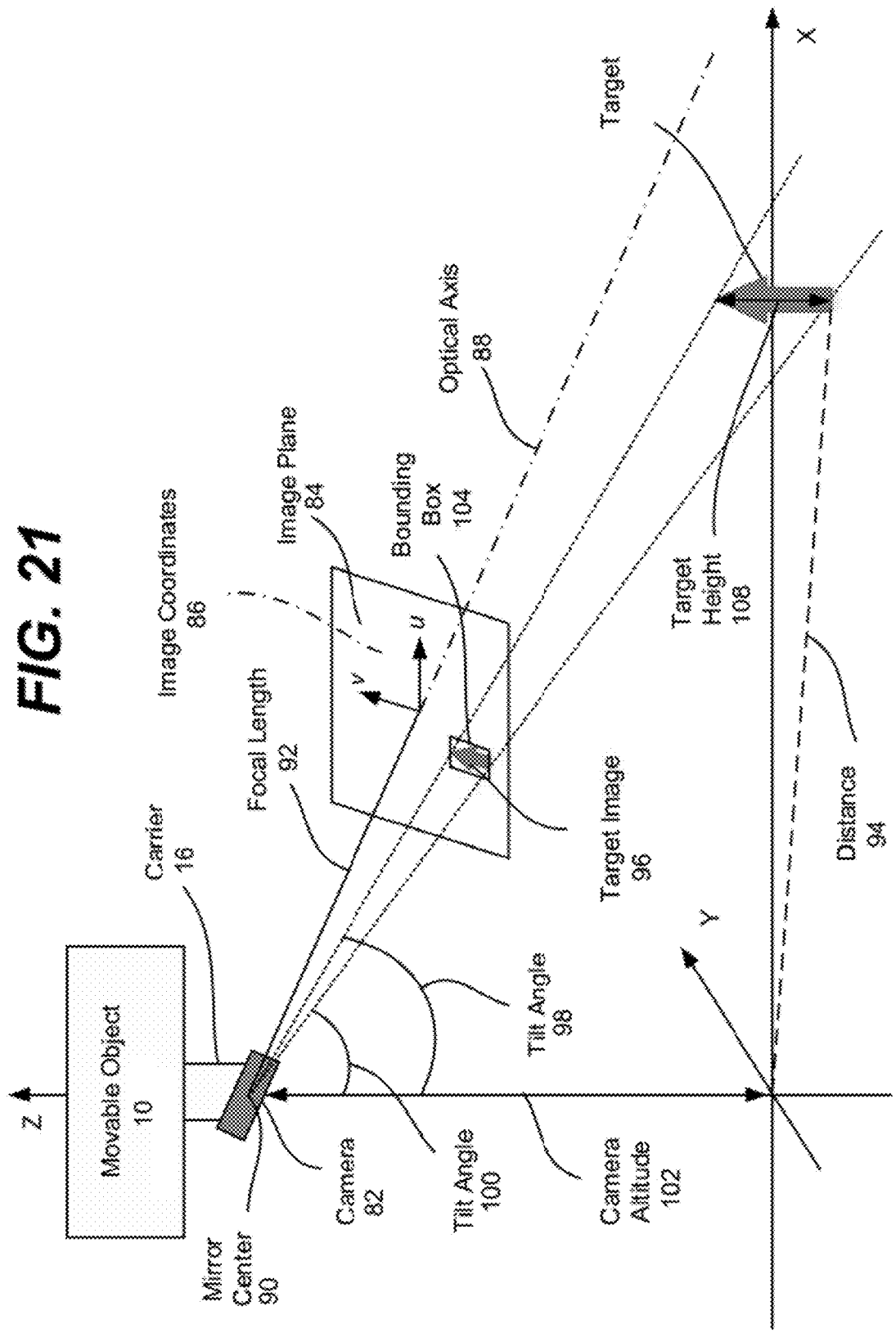

Another method of determining the radius r is described with reference to FIG. 21. As shown in FIG. 21, the movable object 10 with carrier 16 may carry an imaging device, such as a camera 82. Camera 82 can capture an image of the target on an image plane 84 with an image coordinates 86. Using similar techniques as described above, a bounding box 72 may also be generated for analyzing geometry shapes and providing continuous and stable results.

As shown in FIG. 21, the image of a target may be represented based on an aperture imaging model, which assumes that a light ray from an object point in a three dimensional space can be projected on an image plane to form an image point. The optical axis 88 can pass through both the mirror center 90 and the image center. The distance between the mirror center and the image center can be equal or substantial similar to the focal length 92. For illustration purposes only, the image plane 84 can be moved to the mirror position on the optical axis 88 between the mirror center 90 and the target.

In accordance with various embodiments of the present disclosure, the system can perform an initialization step, which includes estimating both the target distance and target height. Here, the system can determine the projected relative distance 94 on the ground between the mirror center 90 and the target based on the geometry relationship. Then, the system can determine the target height.

At the initialization stage (i.e., when t=0), the system can assume that the altitude of the movable object 10 (i.e., the camera 82) is measured from the same floor (or horizontal line) where the target stands. Without limitation, when the floor is not a horizontal line, the system can use the effective altitude, which accounts for the altitude difference, to replace the actually measured altitude of the movable object 10 for measuring the target distance and target height.

In the example as shown in FIG. 21, the target may have a top target point $(x_t, y_t, z_t)$ and a bottom target point $(x_b, y_b, z_b)$ in a world coordinates, which are projected on the image plane 84 as a top image point $(u_t, v_t)$ and a bottom image point $(u_b, v_b)$ respectively in the target image 96. A top line passes through the mirror center 90, the top image point, and the top target point and can have a tilt angle 98 from the axis Z of the world coordinates. Also, a bottom line passes through the mirror center 90, the bottom image point, and the bottom target point and can have a tilt angle 100 from the axis Z.

Thus, the target top and bottom direction vectors $\vec{T}$ and $\vec{B}$ can be expressed as in the following.

$$\vec{T} = \begin{pmatrix} x_t \\ y_t \\ z_t \end{pmatrix} \sim RK^{-1} \begin{pmatrix} u_t \\ v_t \\ 1 \end{pmatrix}$$

$$\vec{B} = \begin{pmatrix} x_b \\ y_b \\ z_b \end{pmatrix} \sim RK^{-1} \begin{pmatrix} u_b \\ v_b \\ 1 \end{pmatrix}$$

where K represents the intrinsic matrix of the camera, and R represents the camera rotation.

Then, the system can estimate the target distance based on the measured or effective camera altitude 102 and the position of the bounding box 104 in the image coordinates 86. For example, the distance 106 can be calculated as $d=-h_c/z_b*P_b$, and the target height 108 can be calculated as $h_o=h_c+z_t d/P_t$, where $P_b$ is the projection length of $\vec{B}$ on the ground and $P_t$ is the projection length of $\vec{T}$ on the ground, which are defined as in the following.

$$P_b = \sqrt{x_b^2 + y_b^2}$$

$$P_t = \sqrt{x_t^2 + y_t^2}$$

After the initialization step, the system can estimate the distance 106 from the target, even when the target altitude changes (e.g., when the target is off the ground) and when the altitude of the movable object 10 (e.g. a UAV) is unknown. This is beneficial, since during the tracking, the object may climb up or go down and the altitude of the UAV may be unreliable as the UAV flies over grasses or climbs up (e.g., 5 meters above the ground).

As shown in FIG. 21, after the initialization, the projected relative distance 106 on the ground between the target 10 and the movable object 10 can be calculated as $h_c/dh$, where dh present the estimate height of the target at a unit distance away from the camera, which can be computed using the following formula.

$$dh = \left\| \frac{\vec{T}}{P_t} - \frac{\vec{B}}{P_b} \right\|$$

Thus, the method can be efficient and may have very few restrictions once it is initialized, since the system can estimate the distance 106 from the object based on the height of the target after the initialization.

After determining the radius r of rotation, the maximum tangential velocity $V_{Tmax}$ may be determined through the relationship with a maximum centripetal acceleration $$a_{max} = \frac{v_{t\,max}^2}{r}.$$

The maximum centripetal acceleration of movable object 10 may be inherently determined by its structural design, in that, regardless of other flight parameters, movable object 10 may reach a certain maximum tilting angle at which it can no longer sustain flight and will stall. In other words, as movable object 10 is tilted to increase its centripetal acceleration, a maximum acceleration will be reached when movable object 10 reaches a tilting angle at which it can no longer sustain controlled flight. This maximum angle may be determined empirically or may be provided by the manufacturer of movable object 10. Thus, assuming a known value for $a_{max}$, the maximum tangential velocity $V_{Tmax}$ can then be determined.

When movable object 10 is circling the target, the controller of movable object 10 may be configured to receive a user input (e.g., via one or more input levers 38, 40 of terminal 32) indicative of a selection of a desired tangential velocity between a maximum desired tangential velocity and a minimum desired tangential velocity. The controller of movable object 10 may be configured to receive the user input via one or more of a lever, stick, button, dial, knob, touch screen, or electronic device. In some embodiments, the electronic device may include memory and at least one processor configured to execute a program for providing an "app" or one or more graphical user interfaces for receiving input from the user for selecting a desired tangential velocity.

As used herein, the term "between," when used with reference to a range of values, may be inclusive of endpoint values. That is, the user may provide input indicative of, for example, a roll setting that can increase or decrease the tangential velocity of the movable object while circling the target. When the user moves the input device for adjusting the roll setting all the way to a maximum displacement, a signal for a maximum roll setting may be generated. However, applying maximum roll to the movable object may cause it to stall during flight, and so the controller 22 may be configured to limit the user's input and only permit roll settings that will ensure the movable object will remain below its maximum tangential velocity determined for the current radius of rotation. That is, the controller of movable object 10 may set the maximum desired tangential velocity that is possible to select to a limit value that is no greater than the maximum allowable tangential velocity of the movable object 10. In this way, the user may be prevented from applying too much roll and stalling the movable object 10. In some embodiments, the maximum desired tangential velocity that is possible to select may be further limited, such as to a value below the maximum tangential velocity or by a percent of the maximum tangential velocity (e.g., 95%, 90%, 85%, etc.). In this way, it may be less likely that the movable object may be caused to reach a maximum roll value and be suddenly unable to maintain controlled flight.

Figure 22:
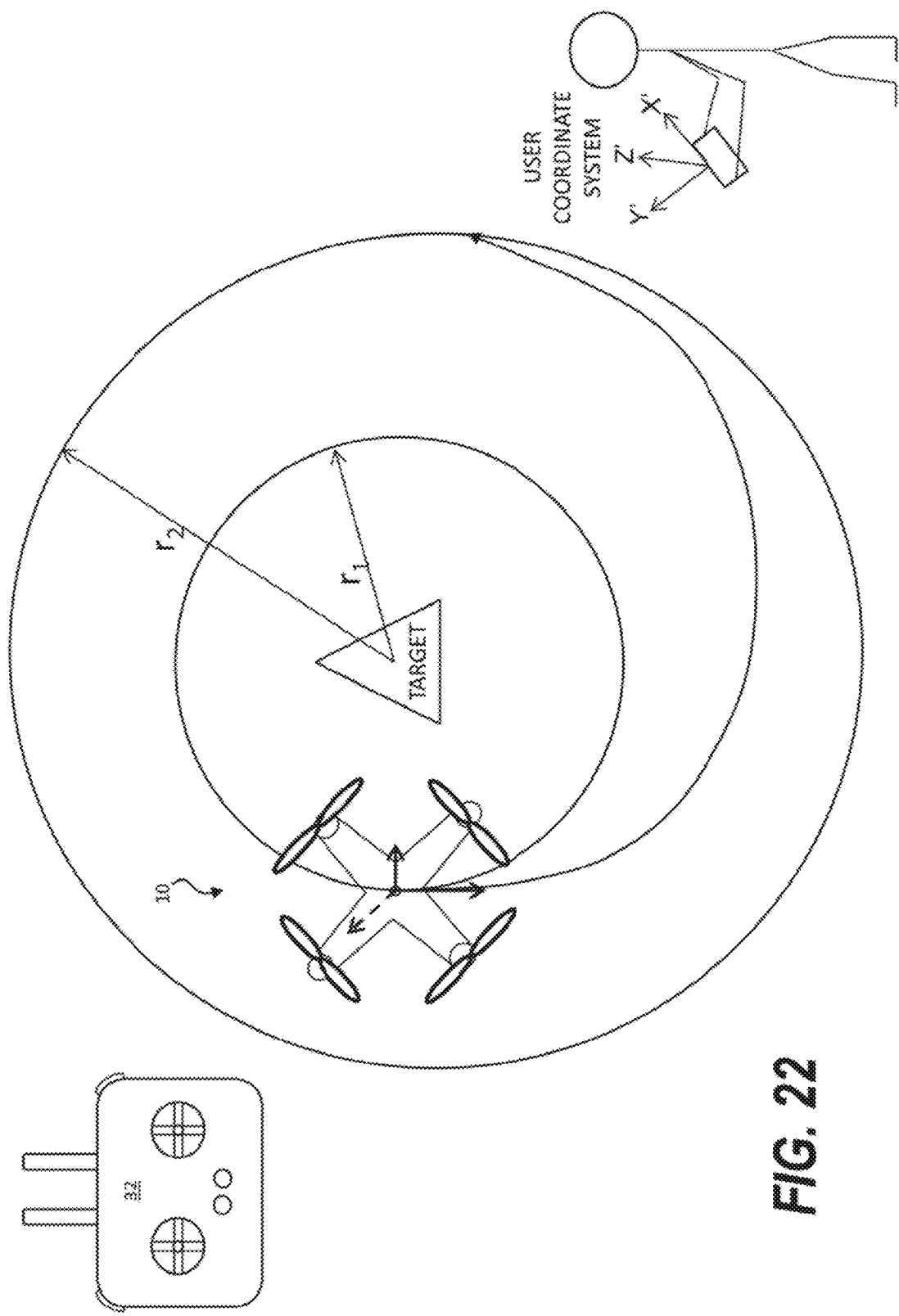

In some situations, such as when movable device is circling and tracking a target, the user may wish to increase the radius r of rotation of the movable object or gradually circle away from the target and terminate the tracking operation, as shown in FIG. 22. To allow the user to perform such a maneuver, the user controller of movable object 10 may be configured to set the maximum desired tangential velocity that can be selected to a limit value above the maximum allowable tangential velocity of the movable object. For instance, the maximum desired tangential velocity that can be selected may be set to a value or percentage that will allow the user to gradually increase the radius of rotation of movable object 10 by increasing the tangential velocity and overcoming centripetal forces acting on movable object 10. In this way, the controller may be configured to allow the movable object 10 to track the target at a larger radius of rotation or to gradually circle away from the target and terminate the tracking operation.

It will be apparent to those skilled in the art that various modifications and variations can be made to the disclosed methods and systems. Other embodiments will be apparent to those skilled in the art from consideration of the specification and practice of the disclosed methods and systems. It is intended that the specification and examples be considered as exemplary only, with a true scope being indicated by the following claims and their equivalents.

What is claimed is:

1. A method for controlling a movable object, comprising:
   receiving, through a controller of the movable object, a user input that includes a first parameter corresponding to a first coordinate system;
   determining, through the controller, an operation mode according to a selection signal triggered on a terminal communicatively coupled to the controller, the operation mode including a first operation mode and a second operation mode;
   in response to determining the operation mode being the first operation mode:
     generating, without translation, a second parameter corresponding to a second coordinate system based on the first parameter corresponding to the first coordinate system; and
     controlling, through the controller, the movable object to move based on the second parameter; and
   in response to determining the operation mode being the second operation mode:
     translating, through the controller, the first parameter corresponding to the first coordinate system to a third parameter corresponding to the second coordinate system based on an offset between the first coordinate system and the second coordinate system; and
     controlling, through the controller, the movable object to move based on the third parameter.

2. The method of claim 1, wherein the first coordinate system is associated with the terminal communicatively coupled to the movable object.

3. The method of claim 1, wherein the second coordinate system is associated with the movable object.

4. The method of claim 1, further comprising:
   determining a transformation matrix based on the offset; and
   calculating the third parameter corresponding to the second coordinate system based on the transformation matrix and the first parameter corresponding to the first coordinate system.

5. The method of claim 1, further comprising initially aligning the second coordinate system with the first coordinate system.

6. The method of claim 1, wherein in response to determining the operation mode being the second mode, the method further comprises:
   receiving, through the controller, a positioning signal from a positioning device, the positioning signal including a relative position information between the first coordinate system and the second coordinate system; and
   determining the offset based on the positioning signal.

7. The method of claim 1, wherein in response to determining the operation mode being the second mode, the method further comprises:

determining at least a first axis of the first coordinate system through a first signal indicative of the first axis of the first coordinate system;

determining at least a first axis of the second coordinate system through a second signal indicative of the second axis of the second coordinate system; and determining the offset based on the first axis of the first coordinate system and the first axis of the second coordinate system.

8. The method of claim 7, further comprising:

determining a second axis of the first coordinate system based on the first axis of the first coordinate system; or determining a second axis of the second coordinate system based on the first axis of the second coordinate system.

9. The method of claim 7, wherein the offset includes an angle between the first axis of the first coordinate system and the first axis of the second coordinate system.

10. The method of claim 7, wherein the first signal is obtained from the terminal communicatively coupled to the movable object.

11. The method of claim 7, wherein the first signal includes at least one of a compass reading, a positioning signal, or an inertial measurement signal configured to indicate the first axis of the first coordinate system.

12. The method of claim 7, wherein the second signal includes at least one of a compass reading, a positioning signal, or an inertial measurement signal configured to indicate the first axis of the second coordinate system.

13. The method of claim 1, wherein the user input is indicative of a command to adjust a perception of a target while tracking the target.

14. The method of claim 13, further comprising determining a subsequent perception of the target based on the second parameter or the third parameter.

15. The method of claim 14, further comprising generating one or more control signals based on the subsequent perception of the target and controlling, using the one or more control signals, one or more propulsion devices of the movable object to adjust a relative displacement between the movable object and the target.

16. An unmanned aerial vehicle (UAV) system comprising:

one or more propulsion devices; and a controller in communication with the one or more propulsion devices and configured to control the UAV to track a target, the controller including one or more processors configured to:

receive, from a terminal communicatively coupled to the controller, a user input that includes a first parameter corresponding to a first coordinate system;

determine an operation mode according to a selection signal triggered on the terminal, the operation mode including a first operation mode and a second operation mode;

in response to determining the operation mode being the first operation mode:

generate, without translation, a second parameter corresponding to a second coordinate system based on the first parameter corresponding to the first coordinate system; and control the movable object to move based on the second parameter; and in response to determining the operation mode being the second operation mode:

translate the first parameter corresponding to the first coordinate system to a third parameter corresponding to the second coordinate system based on an offset between the first coordinate system and the second coordinate system; and control the movable object to move based on the third parameter.

17. The UAV of claim 16, wherein the one or more processors are further configured to determine a control speed for moving the UAV.

18. The UAV of claim 16, further comprising:

a sensory device configured to provide input to the one or more processors for determining a subsequent perception of the target.

19. The UAV of claim 16, further comprising:

a sensory device;

wherein the one or more processors are further configured to determine a radius of rotation of the UAV about the target based on an arc length of travel and an angular displacement of the UAV, the angular displacement of the UAV being determined based on information generated by the sensory device.

20. A non-transitory computer readable medium storing instructions that, when executed, cause a computer to perform a method for controlling a movable object, the method comprising:

receiving a user input that includes a first parameter corresponding to a first coordinate system;

determining an operation mode according to a selection signal triggered on a terminal, the operation mode including a first operation mode and a second operation mode;

in response to determining the operation mode being the first operation mode:

generating, without translation, a second parameter corresponding to a second coordinate system based on the first parameter corresponding to the first coordinate system; and controlling the movable object to move based on the second parameter; and in response to determining the operation mode being the second operation mode:

translating the first parameter corresponding to the first coordinate system to a third parameter corresponding to the second coordinate system based on an offset between the first coordinate system and the second coordinate system; and controlling the movable object to move based on the third parameter.

* * * * *